(12) United States Patent
Takiishi et al.

(10) Patent No.: US 7,650,261 B2
(45) Date of Patent: Jan. 19, 2010

(54) MULTI-PATH GENERATING APPARATUS, A MULTI-PATH FADING SIMULATOR, AND A MULTI-PATH GENERATING METHOD

(75) Inventors: Kosei Takiishi, Yokosuka (JP); Tokio Taga, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 157 days.

(21) Appl. No.: 10/780,637

(22) Filed: Feb. 19, 2004

(65) Prior Publication Data
US 2004/0167758 A1 Aug. 26, 2004

(30) Foreign Application Priority Data
Feb. 21, 2003 (JP) ............................. 2003-045104

(51) Int. Cl.
*G06F 7/60* (2006.01)
*G06F 17/10* (2006.01)
(52) U.S. Cl. ........................... 703/2; 375/316; 333/142; 455/506
(58) Field of Classification Search ................... 703/2; 375/316; 333/142; 455/506
See application file for complete search history.

(56) References Cited
FOREIGN PATENT DOCUMENTS

| JP | 04-351024 | 12/1992 |
|----|-----------|---------|
| JP | 06-104855 | 4/1994 |
| JP | 07-177107 | 7/1995 |
| JP | 11-281697 | 10/1999 |
| JP | 2000-261386 | 9/2000 |

OTHER PUBLICATIONS

Coulson et al. "A Statistical Basis for Lognormal Shadowing Effects in Multipath Fading Channels" IEEE 1998.*

"A Statistical Wideband Propagation Model for Smart Antenna Systems", Mahmoudi et al. 1998 IEEE.*
"Multipath Propagation Characterization for Terrestrial Mobile and Fixed Microwave Communications." Zhao. Oct. 2002.*

(Continued)

*Primary Examiner*—Kamini Shah
*Assistant Examiner*—Saif Alhija
(74) *Attorney, Agent, or Firm*—Oblon, Spivak, McClelland, Maier & Neustadt, L.L.P.

(57) ABSTRACT

A time-varying multi-path generating apparatus that generates time-varying characteristics of propagation path parameters, a multi-path fading simulator, and a multi-path generating method are disclosed. The generating apparatus for simulating multi-path fluctuations in radio communications consists of a parameter control unit for controlling generation conditions of propagation paths, a data storage unit for storing propagation path generation parameters and data files, and a propagation path generating unit for generating time-varying propagation paths. Multiple time-varying amplitude functions and multiple time-varying phase functions are generated based on the data files, the propagation path generation parameters, and random numbers generated by a random number generating unit. The time-varying amplitude functions are aligned serially in the time domain such that a time-varying shadow amplitude function is obtained, which is repeated N times where N represents the number of propagation paths. The time-varying phase functions are aligned serially such that a time-varying shadow phase function is obtained, which is repeated N times, resulting in N time-varying shadow phase functions. An initial amplitude, an initial phase, an initial time delay, and an initial arrival direction are generated as the propagation path parameters of a propagation path using random numbers based on the initial value generation parameters. The time-varying shadow amplitude functions and the time-varying shadow phase functions are superimposed on the initial amplitude and the initial phase, respectively, for generating time-varying propagation paths.

8 Claims, 18 Drawing Sheets

OTHER PUBLICATIONS

Zhao et al. "Multipath Propagation Study Combining Terrain Diffraction and Reflection", IEEE 2001.*

Cavalcante et al. "Mobile Radio Propagation Along Mixed Paths in Forest Environment", Journal of Microwaves and Optoelectronics, vol. 1, No. 4, Sep. 1999.*

M. Shinji, "Radio Propagation Path Propagation in Wireless Communications", pp. 208-211, 1992.

Recommendation ITU-R M.1225, pp. 173-232, "Guidelines for Evaluation of Radio Transmission Technologies for IMT-2000", 1997.

W. C. Jakes, Microwave Mobile Communication, pp. 11-19, "Multipath Interference", 1974.

Y. Karasawa, et al., IEEE Transactions on Vehicular Technology, vol. 46, No. 1, pp. 194-202, "The Equivalent Transmission-Path Model-A Tool for Analyzing Error Floor Characteristics Due to Intersymbol Interference in Nakagami-Rice Fading Environments", Feb. 1997.

T. Yamada, et al., Technical Report of IEICE. A-P2000-96, SANE2000-73, RCS2000-199(2000-10), pp. 95-100, "System Performance Evaluations Using Field Measurement Data for Spatial and Temporal Equalizer" (with English Abstract).

S. Ichitsubo, et al., IEEE Journal on Selected Areas in Communications, vol. 20, No. 6, "Multipath Propagation Model of Spatio-Temporal Dispersion Observed at Base Station in Urban Areas", Aug. 2002.

Yoshio Karasawa et al., Real-time Simulation Scheme of Mobile Radio Propagation Channel Based on a Statistical Model, Journal of IEICE, Japan, The Institute of Electronics. Information and Communication Engineers, Nov. 25, 2000, vol. 83, No. 11, pp. 884-888.

Yoshio Karasawa et al., Analysis of Availability Improvement in LMSS by Means of Satellite Diversity Based on Three-State Propagation Channel Model, IEEE Transactions on Vehicular Technology, U.S.A. Nov. 1997. vol. 46, No. 4, November, p. 1047-1056.

Tomml Jämsä, et al.; "Real-Time Simulation of Adaptive Array Antenna using Broadband Vector Channel Simulator"; 2002 IEEE; pp. 188-192.

Werner Mohr; "Special Topics in Wideband Mobile Radio Channel Modelling and Measurements"; pp. 5/1-5/7; ACTS Project FRAMES AC090, Siemens AG, Hofmannstrasse 51, D-81359 Munich, Germany.

* cited by examiner

FIG.1
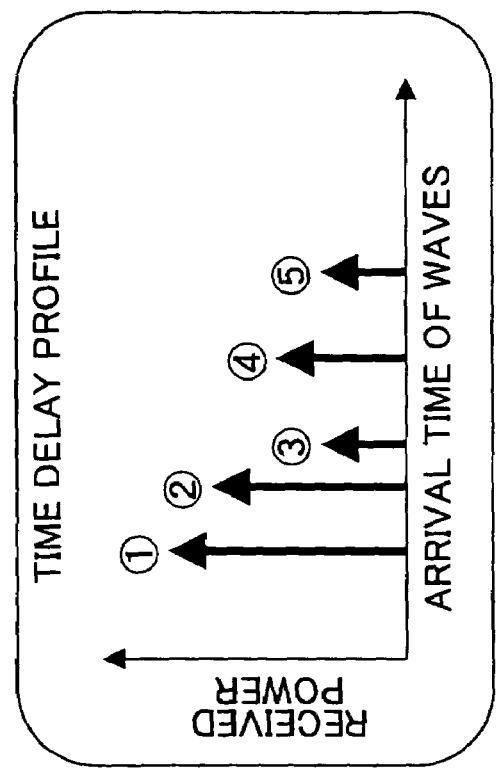
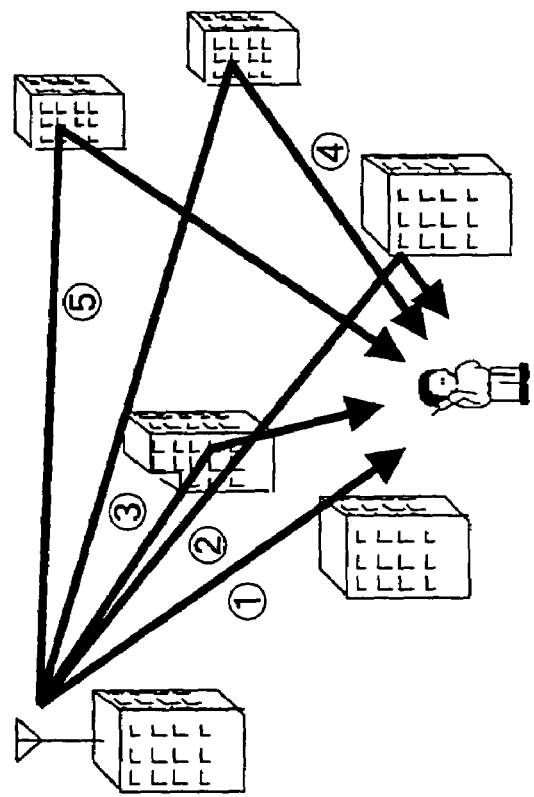

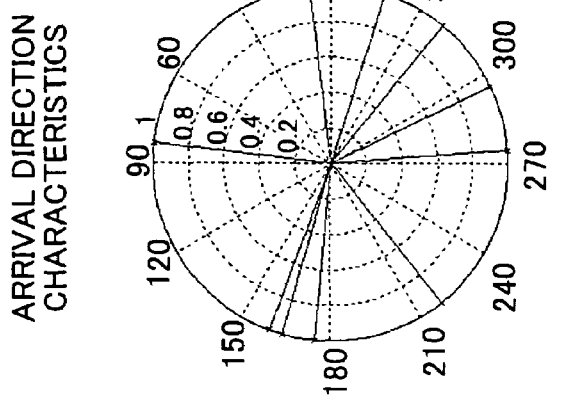
FIG.7C ARRIVAL DIRECTION CHARACTERISTICS
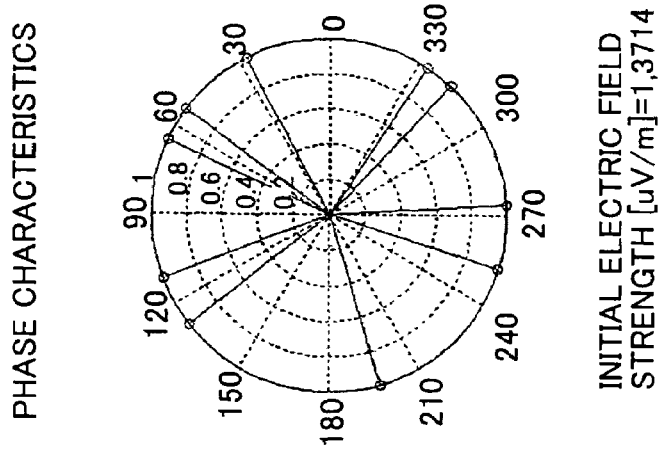
FIG.7B PHASE CHARACTERISTICS
INITIAL ELECTRIC FIELD STRENGTH [μV/m]=1,3714
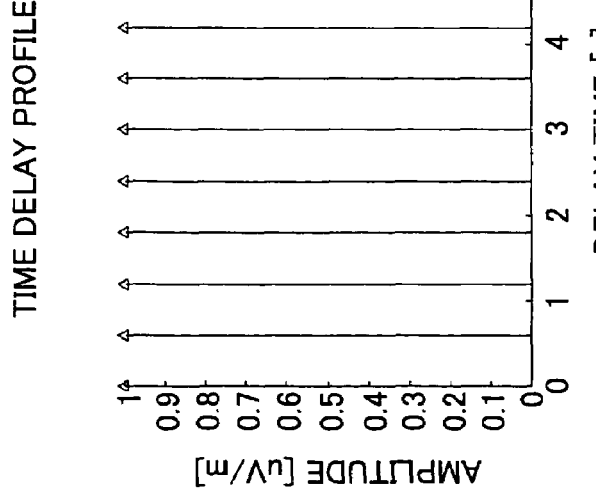
FIG.7A TIME DELAY PROFILE

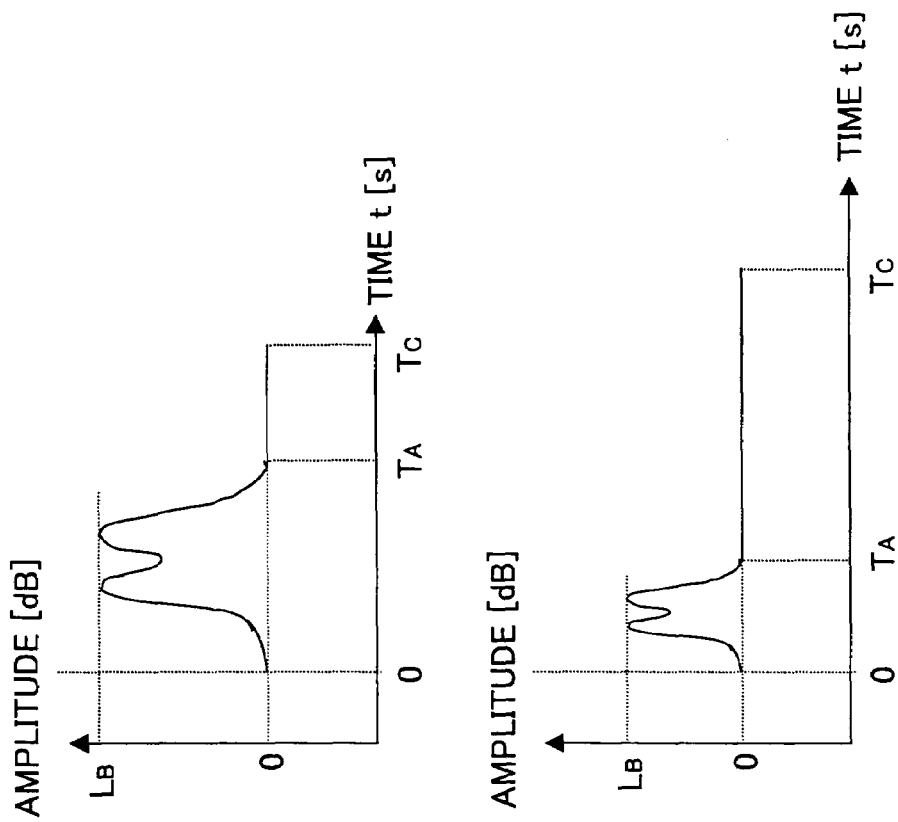
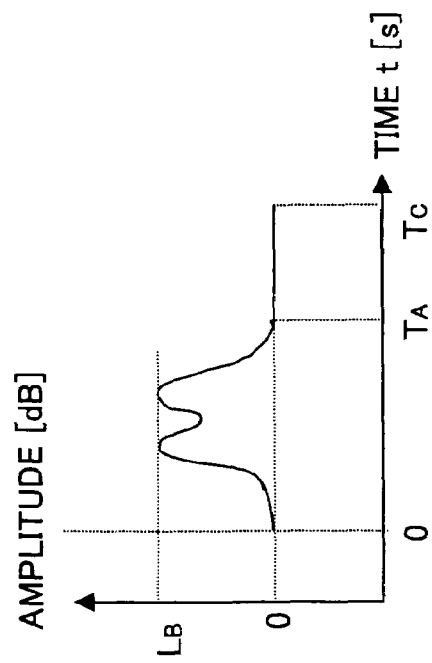

FIG.10A
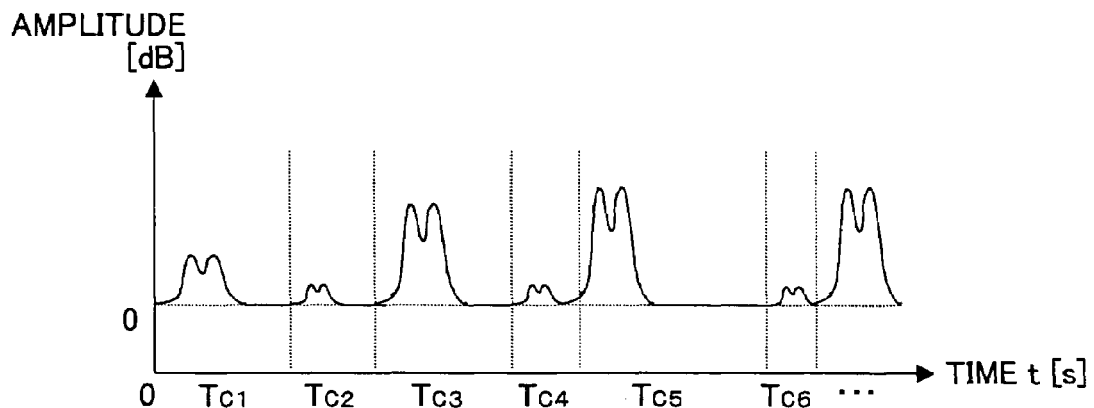
IN CASE OF NO OVERLAPPING OF SHADOW TIME
($T_{ai} \leq T_{ci}$)
FIG.10B
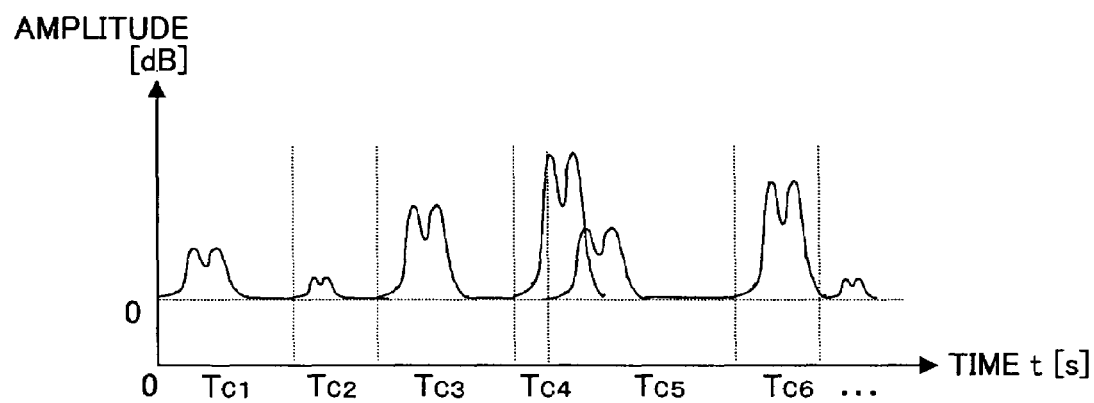
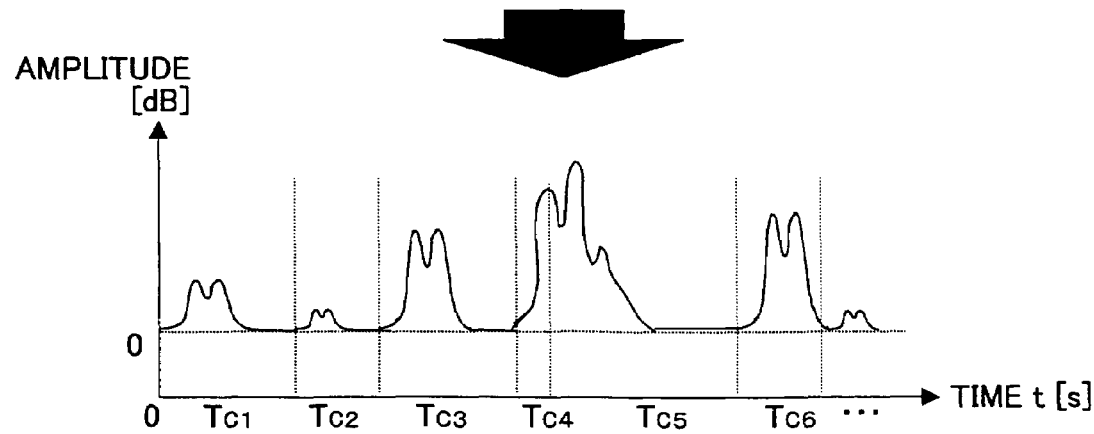
IN CASE SHADOW TIME OVERLAPS
($T_{a4} \leq T_{c4}$)

MULTI-PATH GENERATING APPARATUS, A MULTI-PATH FADING SIMULATOR, AND A MULTI-PATH GENERATING METHOD

BACKGROUND OF THE INVENTION

1. Field of the Invention

The present invention generally relates to a time-varying multi-path generating apparatus, a multi-path fading simulator employing the time-varying multi-path generating apparatus, and a multi-path generating method for simulating multi-path fluctuations in radio communications systems, such as mobile communications systems; and specifically relates to a time-varying multi-path generating apparatus, a multi-path fading simulator employing the time-varying multi-path generating apparatus, and a multi-path generating method wherein time-varying multi-paths are generated by adding time-varying propagation path fluctuations to parameters such as arrival direction characteristics, phase characteristics, time delay characteristics, and power level characteristics of each propagation path corresponding to input parameters.

2. Description of the Related Art

FIG. 1 is a conceptual diagram showing the case wherein a radio propagation path is provided from a base station antenna to a mobile station, the radio propagation path often reaching the mobile station through multiple propagation paths established by reflection and diffraction due to an obstacle such as a building. On the right-hand side of FIG. 1, an example of a time delay profile is shown. In the time delay profile where five propagation paths are shown, the horizontal axis represents the propagation delay time (hereafter called time delay) of the radio propagation paths (hereafter called propagation paths) that arrive at the mobile station, and the vertical axis represents received power. The time delay and the received power may be expressed in either of absolute values and relative values.

The propagation paths (1), (2), (3), (4), and (5) shown in the delay profile are regarded as plane waves. A propagation path that has the smallest time delay is the propagation path (1) that reaches the mobile station via the shortest path from the base station, and the propagation paths with greater time delays than the propagation path (1) reach the mobile station after reflection and diffraction by buildings, mountains, etc. As for the propagation paths with the greater time delay, since the propagation loss increases as the propagation distance becomes greater with the number of times of reflection and diffraction increasing, received power tends to become smaller.

FIG. 2 is a graph that shows an example of the delay profile measured with a mobile station moving along a road (non-patent reference 1). It is clearly shown that the time delay and received power of a propagation path are changing with the movement of the mobile station.

When a mobile communications system is designed, a simulator for simulating the transmission quality of the space between the base station and the mobile station is required in order to determine whether the system can allow certain propagation path fluctuations, and in order to determine optimal system parameter values. A fading simulator is often used for evaluating the transmission quality of mobile communications systems. The fading simulator applies fading to a modulated signal that is provided by a transmitter, and outputs the faded modulated signal to a receiver. In that case, the fading simulator superimposes a modulating signal on a carrier propagation path that has a time delay, the time delay being specified by a simulator operator according to a profile model such as the Vehicular-B model (non-patent reference 2) recommended by ITU (International Telecommunication Union), etc., and applies Nakagami-Rice fading or Rayleigh fading; or, alternatively, the delay profile is calculated by ray tracing, wherein modulating signals are superimposed on carriers having different time delays, and fading that is the same as above is applied.

In conventional mobile communications systems with a relatively low transmission speed, it is sufficient to consider receiving power level characteristics (e.g., Rayleigh fading model; non-patent reference 3), and delay characteristics (e.g., equivalent transmission-line model; non-patent reference 4). For this reason, it is not necessary to generate propagation characteristics of a propagation path that properly simulates the real environment. Accordingly, fading simulators are designed to provide power level fluctuations that follow the Nakagami-Rice distribution or Rayleigh distribution that defines propagation path fluctuations as a vector sum of two or more propagation paths without taking correlations between propagation paths into consideration.

[Non-patent Reference 1]
Masaaki Shinji, "Radio propagation path propagation in wireless communications", 1992, page 210

[Non-patent Reference 2]
ITU-R M. 1225, "Guidelines for evaluation of radio transmission technologies for IMT-2000", 1997

[Non-patent Reference 3]
Jakes, W. C. Jr. and ed.: "Micropropagation Path Mobile Communications", John Wiley & Sons, Inc., New York, 1974

[Non-patent Reference 4]
Y. Karasawa, T. Kuroda, and H. Iwai: "The equivalent transmission-path model, —A Tool for Analyzing error floor characteristics due to inter-symbol interference in Nakagami-Rice fading environments", IEEE Trans. Veh. Technol. 46 [1] pp. 194-202, 1997

[Non-patent Reference 5]
Yamada, Tomisato, Matsumoto: "The system evaluation of a spatial-temporal equalizer using real propagation data" Shin-Gaku Giho A-P 2000-96 (2000-10)

[Non-patent Reference 6]
S. Ichitsubo, K. Tsunekawa, and Y. Ebine: "Multipath Propagation Model of Spatio-Temporal Dispersion Observed at Base Station in Urban Areas", IEEE Journal on selected areas in communications, Vol. 20, No. 6, August 2002.

[Problem(s) to be Solved by the Invention]

Indispensable technology for the 4G (fourth generation) mobile communications (broadband-transmission) includes adaptive equalization technology for removing an unnecessary propagation path on the delay time axis, and adaptive array antenna (AAA) technology for separating an unnecessary propagation path on the space axis (the radio propagation path arrival direction). Research and development towards the realization of these technologies are being energetically furthered (non-patent reference 5). Further, where the transmission speed (bit rate) is high, an incoming propagation path can be separated into multiple propagation-delay propagation paths (a single propagation path, or multiple propagation paths compounded). For this reason, the influence of fading that is a problem in conventional transmission systems at a low transmission speed can be mitigated in high-speed transmission, and communication quality can be improved. Accordingly, in order to perform highly precise evaluation of transmission characteristics, it becomes important that propagation characteristics be individually reproducible for each of such multiple propagation paths between the base station and the mobile receiving station.

The propagation characteristics of a propagation path to be considered include propagation-delay characteristics and arrival direction characteristics, and analysis of the characteristics and modeling thereof are being studied (non-patent reference 6). For example, it is known that an exponential-function model reasonably approximates the propagation-delay characteristics, namely, the received power exponentially decreases according to the time delay (non-patent reference 3). However, in model approaches such as described above, the time variation characteristics of the propagation path are defined as a mere superimposition of either the Nakagami-Rice fading or the Rayleigh fading fluctuations, where fluctuation characteristics of the multiple propagation paths are simply added.

Furthermore, in order to evaluate a communications system using adaptive equalization technology and AAA technology, a propagation path model needs to consider all of the arrival direction characteristics, delay time characteristics, and receiving power level characteristics.

As a factor of the power level fluctuation of each propagation path, shadowing (blocking) of the propagation path by the presence and movement of an obstacle such as a car and a human body is to be considered. In addition, when the mobile station moves, a building and the like may interfere with the propagation path. For this reason, evaluation of each propagation path has to take the power level fluctuation caused by these obstacles into consideration; however, conventional fading simulators do not consider these matters.

Further, as for the propagation paths received by the mobile station in directions that are approximately the same, there must be meaningful correlation between the propagation paths, since the same obstacle would interfere with each of the propagation paths. However, a fading simulator that considers the correlation characteristics of such propagation paths is not yet offered.

SUMMARY OF THE INVENTION

Accordingly, it is a general object of the present invention to provide a time-varying multi-path generating apparatus, a multi-path fading simulator using the time-varying multi-path generating apparatus, and a multi-path generating method that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a time-varying multi-path generating apparatus, a multi-path fading simulator using the time-varying multi-path generating apparatus, and a multi-path generating method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a time-varying multi-path generating apparatus for generating time-varying propagation paths, each of the time-varying propagation paths being generated based on the time variation characteristics (time-varying multi-path fluctuation) of propagation path parameters such as power level characteristics, phase characteristics, time delay characteristics, and arrival direction characteristics, corresponding to simulation conditions that are input with the correlation characteristics of the propagation paths being taken into consideration; a multi-path fading simulator using the time-varying multi-path generating apparatus, and a multi-path generating method.

[Means for Solving the Problem]

An aspect of the present invention provides a time-varying multi-path generating apparatus that includes a parameter control unit, a data storage unit, a random number generating unit, and a propagation path generating unit.

Another aspect of the present invention provides a time-varying multi-path generating apparatus that includes a parameter control unit, a data storage unit, a random number generating unit, a time-varying function generating unit, and a propagation path generating unit.

Another aspect of the present invention provides a multi-path fading simulator that includes the time-varying multi-path generating apparatus, a propagation path output unit, and a signal synthesizing unit.

Another aspect of the present invention provides a time-varying multi-path generating method that includes steps such as a step for storing various propagation path generation parameters and data files, and so on, such that multiple propagation paths are generated, wherein the steps include a step for the parameter control unit reading a file prepared for generating constant parameters of the time-varying functions.

Another aspect of the present invention provides a time-varying multi-path generating method that includes steps such as a step for storing various propagation path generation parameters and data files, and so on, such that multiple propagation paths are generated, wherein the steps includes a step for the parameter control unit specifying a calculation model based on a propagation path generation parameter file.

[Function]

Accordingly, the present invention does not simulate propagation path fluctuation based on Nakagami-Rice fading, Rayleigh fading, etc., that are fluctuation characteristics of a synthetic result of each propagation path. But rather, the present invention considers propagation path fluctuation generated by shadows due to obstacles including moving objects such as vehicles and human bodies, and buildings that are actually present in real propagation paths. Further, the present invention also considers the correlation between spatial propagation paths. In this manner, the present invention provides the time-varying multi-path generating apparatus, the multi-path fading simulator using the time-varying multi-path generating apparatus, and the multi-path generating method for improved simulation of multi-path fading.

BRIEF DESCRIPTION OF THE DRAWINGS

FIG. 1 shows conceptual examples of multiple propagation paths of a radio propagation path provided from a base station to a mobile station through reflection and diffraction, and a time delay profile of radio propagation through each propagation path;

FIG. 7 shows graphic examples of initial values of the propagation path parameters generated according to the embodiment of the present invention;

FIG. 8 shows graphic examples of a time-varying function according to the embodiment of the present invention;

FIG. 10 shows graphs for explaining propagation path fluctuation output according to the embodiment of the present invention when shadow timing is overlapped;

DESCRIPTION OF THE PREFERRED EMBODIMENTS

In the following, embodiments of the present invention are described with reference to the accompanying drawings.

Figure 2:
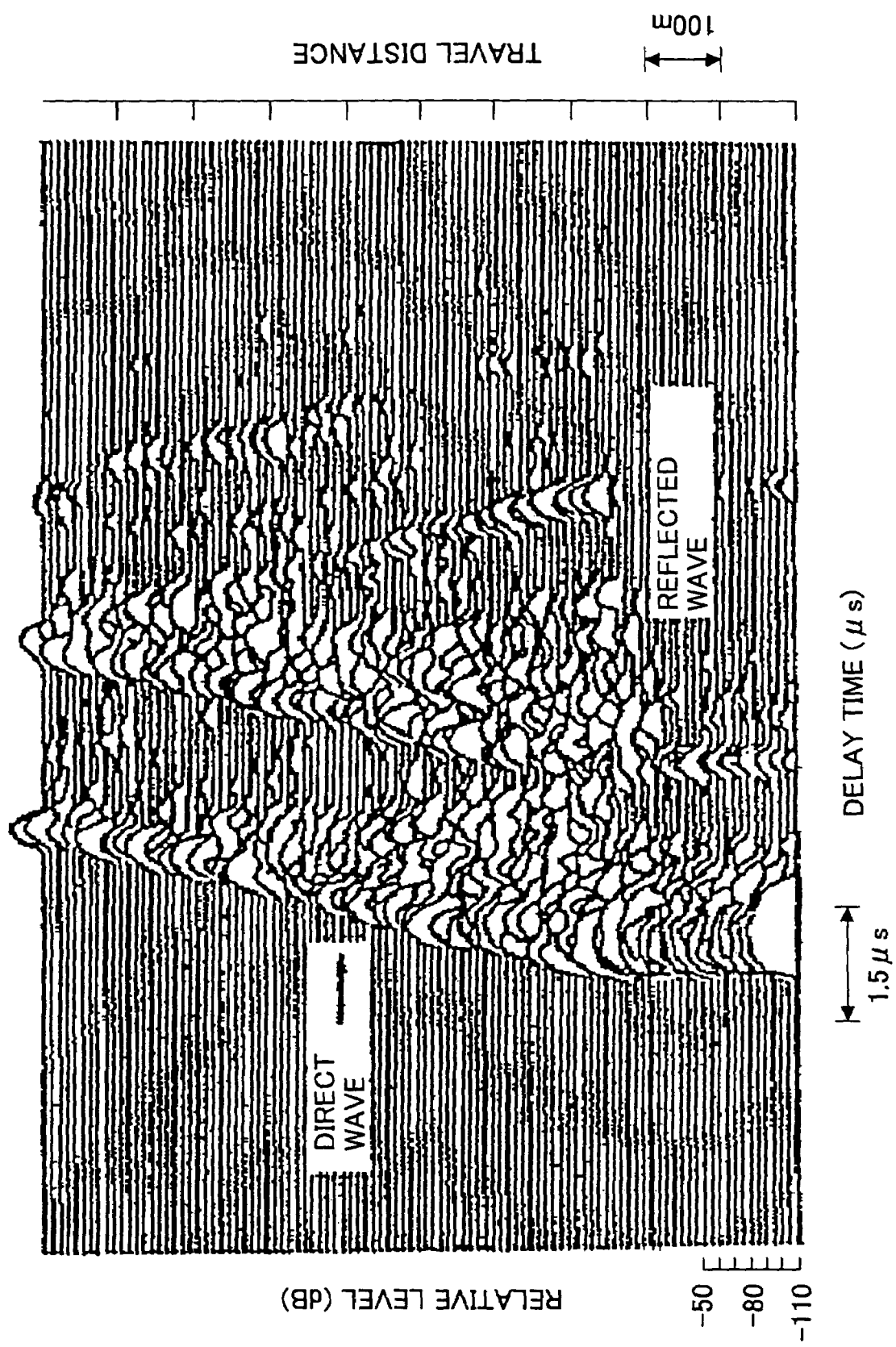
FIG. 2 is a graph showing an example of measurement of the time delay profile when the mobile station is in motion.
Figure 3:
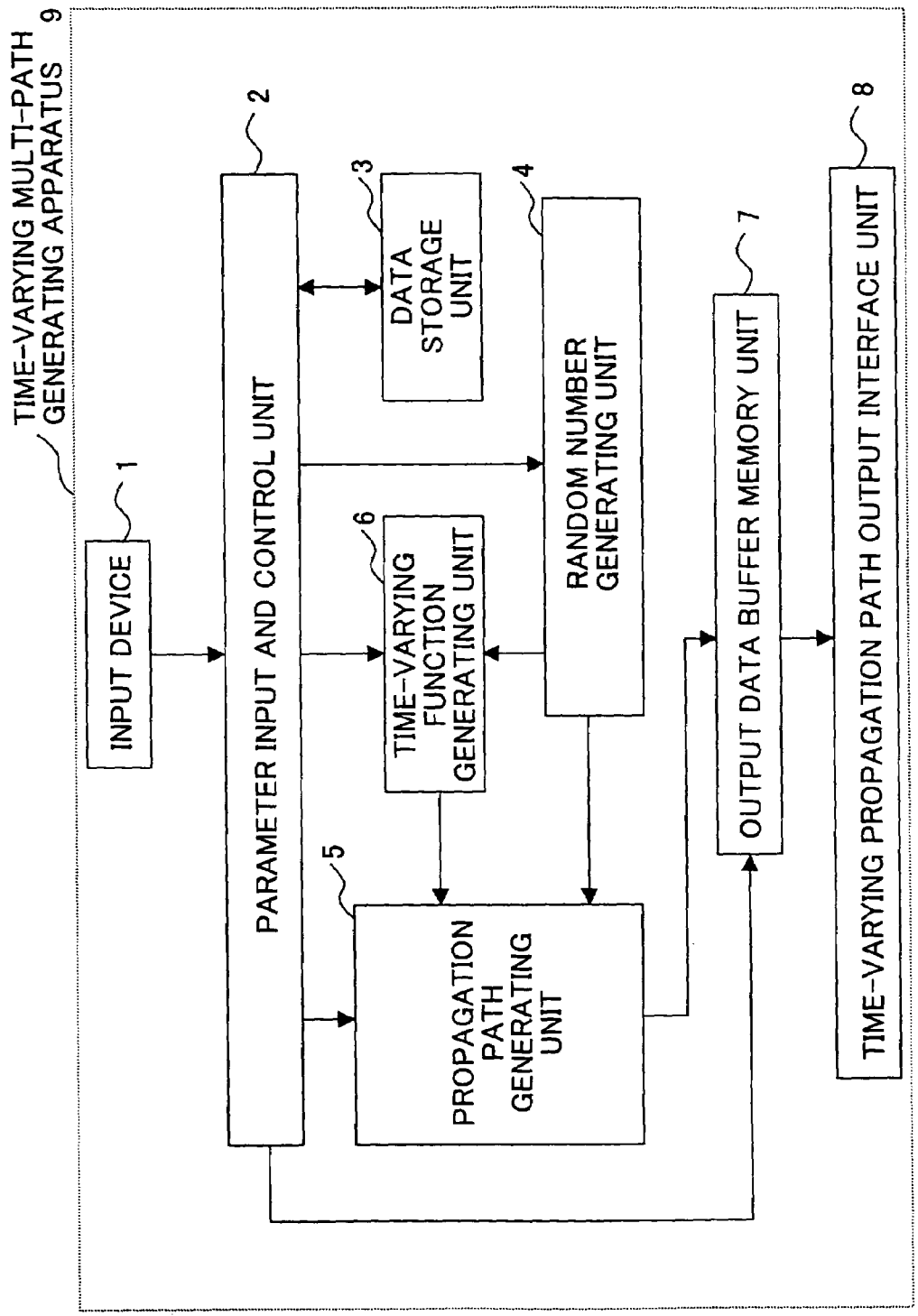
FIG. 3 is a block diagram showing a configuration example of a time-varying multi-path generating apparatus according to an embodiment of the present invention.
Figure 4:
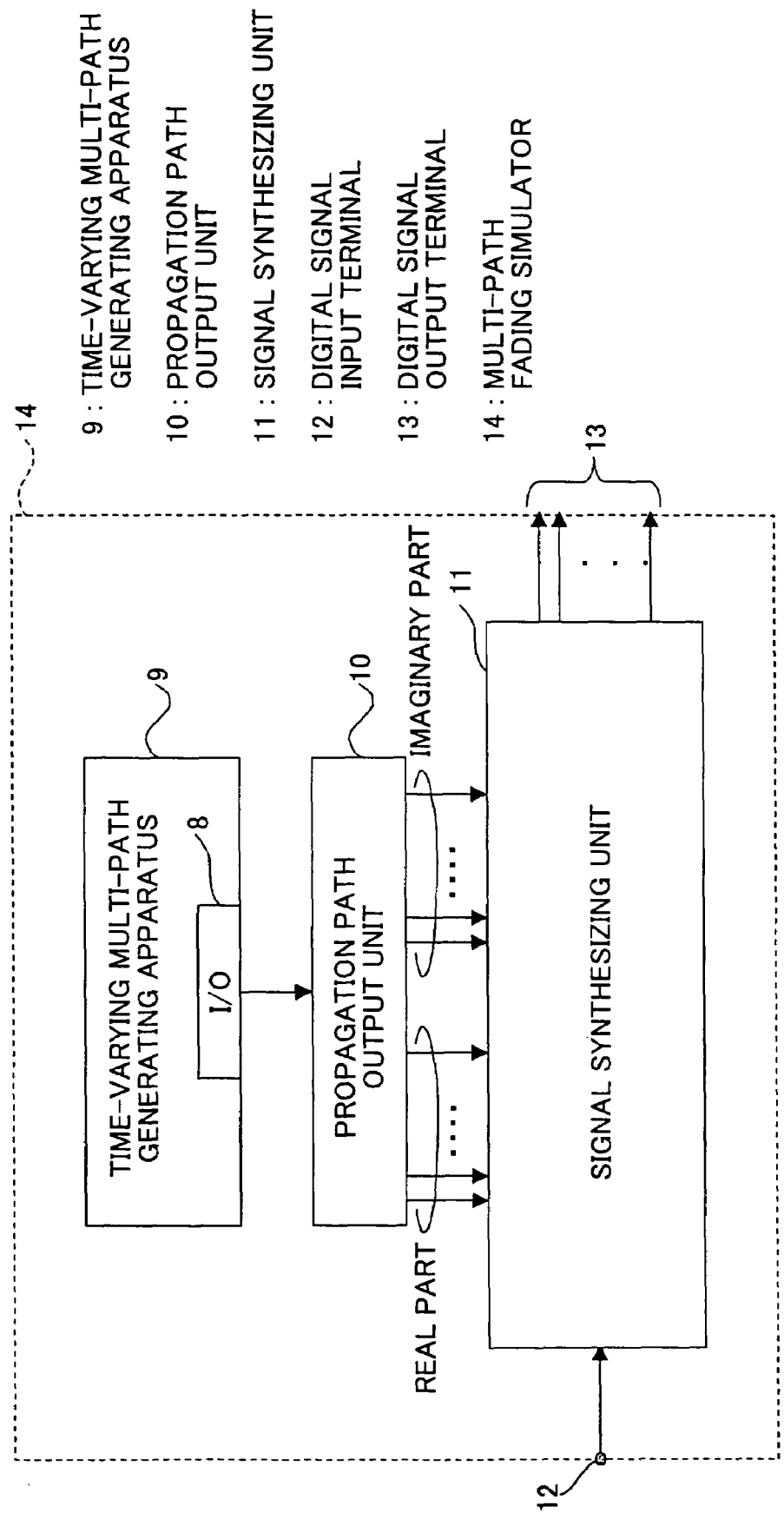
FIG. 4 is a block diagram showing a configuration example of a multi-path-fading simulator according to the embodiment of the present invention.

FIG. 3 is a block diagram showing a configuration example of a time-varying multi-path generating apparatus 9 according to an embodiment of the present invention. In the present specification, "time-varying" means a change and fluctuation of a characteristic along the time axis. For example, propagation path characteristics such as direction, phase, time delay, etc. are variable over time, i.e., are functions of time, with appropriate initial values assigned. The time-varying multi-path generating apparatus 9 according to the present embodiment includes an input device 1, a parameter input and control unit 2, a data storage unit 3, a random number generating unit 4, a propagation path generating unit 5, a time-varying function generating unit 6, an output data buffer memory unit 7, and a time-varying propagation path output interface unit 8. FIG. 4 is a block diagram showing a configuration example of a multi-path simulator 14 according to the embodiment of the present invention. The multi-path simulator 14 includes the time-varying propagation path output interface unit 8, the time-varying multi-path generating apparatus 9, a propagation path output unit 10, a signal synthesizing unit 11, a digital signal input terminal 12, and a digital signal output terminal 13. Each of the items above is described below.

The input device 1 is a device for inputting and outputting data files to/from the data storage unit 3, and inputting various parameters, required for the propagation path generation, that are displayed by the parameter input and control unit 2, and is constituted by a selection from a keyboard, a mouse, a floppy (registered trademark) disk, a memory card, a CD-ROM, a DVD, an MO disk, etc.

The parameter input and control unit 2 displays information about propagation path generation parameters and various data files, and inputs required parameters using the input device 1. Here, data files containing information, such as a time-varying function (a function that varies over time) and an antenna directional-gain pattern, required for propagation path generation, are beforehand input through the parameter input and control unit 2, and stored in the data storage unit 3 as required. Where the necessary data are beforehand stored in the data storage unit 3, it is not necessary to input the data through the parameter input and control unit 2. In this case, the parameter input and control unit 2 may only function as a parameter control unit. Further, parameters required for propagation path generation are specified, and the parameter input and control unit 2 controls all the propagation path generation steps, directing necessary information exchange between the data storage unit 3, the propagation path generating unit 5, and the time-varying function generating unit 6.

In the data storage unit 3, a propagation path generation parameter file, a time-varying function file, an antenna directional-gain pattern file, an incoming propagation path direction density-function file, a distribution function file, etc., are stored.

The propagation path generation parameter file contains:

a frequency of the propagation path F [GHz], the number N of propagation paths to be generated, the number M of output antenna branches, path parameter initial value generation conditions, specification of a delay profile function, an average delay spread $S_D$, a time-varying function type specification value;

a constant-parameter generating condition file an average $<T_A>$ and standard deviation $\sigma_A$ of shadow time interval $T_A$ [sec], an average $<L_B>$ and standard deviation $\sigma_B$, of shadow amplitude $L_B$ [dB], an average $<T_C>$ and standard deviation $\sigma_C$ of shadow occurrence time interval $T_C$ [sec]

an average $<C_d>$ and standard deviation $\sigma_{Cd}$ of falling coefficient $C_d$, an average $<C_r>$ and standard deviation $\sigma_{Cr}$ of rising coefficient $C_r$, shadow time standard deviation $\sigma_S(L_B)$, inter-parameter correlation characteristics files $\rho_A(\Omega)$, $\rho_B(\Omega)$, and $\rho_C(\Omega)$ containing inter-parameter correlation characteristics for an incoming propagation path angle difference, a shadow fluctuation calculation model file, a probability density function file containing probability density functions of shadow dimensions $W_h$ [m], $D_h$ [m], and $H_h$ [m], a penetration angle probability density function file containing a probability density function of penetration angle $\theta_s$ [degrees], which is an angle of a shadowing object to the propagation path, a distance $L_0$ (the shortest propagation path) between the base station and the mobile station, a penetration position probability density function file containing a probability density function of penetration position Ld [m] of the shadow, a moving speed probability density function file containing a probability density function of the moving speed Vs [m/s] of the shadow, moving speed V [m/s] of the mobile station, data sampling interval Dt [sec], and the like, which are input from the parameter input and control unit 2.

The time-varying function file contains plural shadow fluctuation functions $A_j(t)$ and $\phi_j(t)$ that represent an amplitude and phase, respectively, of a propagation path specified by an input from the parameter input and control unit 2.

The antenna directional-gain pattern file contains plural directional-gain patterns (V-polarization patterns and H-polarization patterns) of various antennas to be used for simulation. The patterns may be obtained either by measurement or by calculation. If the patterns are not described in the same format, the patterns are converted into the same format through the parameter input and control unit 2.

The incoming propagation path direction density function file contains plural probability density functions that specify a propagation path occurrence probability by direction. One of the functions is selected according to environmental conditions when a propagation path is to be generated.

The distribution function file contains probability density functions (e.g., an exponential distribution function, an exponentiation distribution function, and a uniform distribution function) for generating random numbers corresponding to various environmental conditions.

The random number generating unit 4 generates random numbers as required by the random number generation parameter that is specified by the parameter input and control unit 2, and provides the generated random numbers to the propagation path generating unit 5 and the time-varying function generating unit 6. When random number generation is required to continue by the parameter input and control unit 2, random numbers are repeatedly generated until a deactivation request is provided by the parameter input and control unit 2, and the generated random-numbers are continuously provided to the propagation path generating unit 5 and the time-varying function generating unit 6.

The propagation path generating unit 5 carries out processes for generating propagation paths according to a generation request from the parameter input and control unit 2. The propagation path generating unit 5 first sets up initial values of the propagation path parameters (amplitude, phase, time delay, arrival direction, and the like) for N propagation paths based on the random numbers generated by the random number generating unit 4, and based on contents of the propagation path generation parameter file specified by the parameter input and control unit 2. Whether the propagation path generating unit 5 generates the time-varying shadow fluctuation based on the time-varying amplitude function and the time-varying phase function stored in the data storage unit 3, or based on a time-varying amplitude function and a time-varying phase function that are to be calculated by the time-varying function generating unit 6, is determined according to contents of the propagation path generation parameter file.

In the case that the time-varying function stored in the data storage unit 3 is to be used, the time-varying function is read from the time-varying function file. Plural constant parameters for the time-varying function are generated based on the random numbers output by the random number generating unit 4 according to the contents of the propagation path generation parameter file, and N time-varying functions corresponding to N propagation paths are generated.

In the case that the time-varying amplitude function and the time-varying phase function newly generated by the time-varying function generating unit 6 are to be used, the shadow fluctuation characteristics (amplitude and phase) that the time-varying function generating unit 6 calculates and outputs based on the contents the propagation path generation parameter file are used as the time-varying function, and N time-varying functions for the N propagation paths are generated with different shadow conditions that are obtained by using random numbers generated by the random number generating unit 4 based on the contents of the propagation path generation parameter file.

The propagation path generating unit 5 repeats the propagation path generating process, generating N time-varying functions every process, until a deactivation request is received. Every time a set of the N time-varying functions is generated, the set is cascaded such that a continuous time-varying function, including a continuous time-varying amplitude functions and a continuous time-varying phase function, for each of the N propagation paths is obtained. The continuous time-varying amplitude function is deducted from the initial amplitude value, and the continuous time-varying phase function is added to the initial phase value for each of the N propagation paths such that the time-varying amplitude characteristics and the time-varying phase characteristics, respectively, are generated for each of the N propagation paths.

Figure 5:
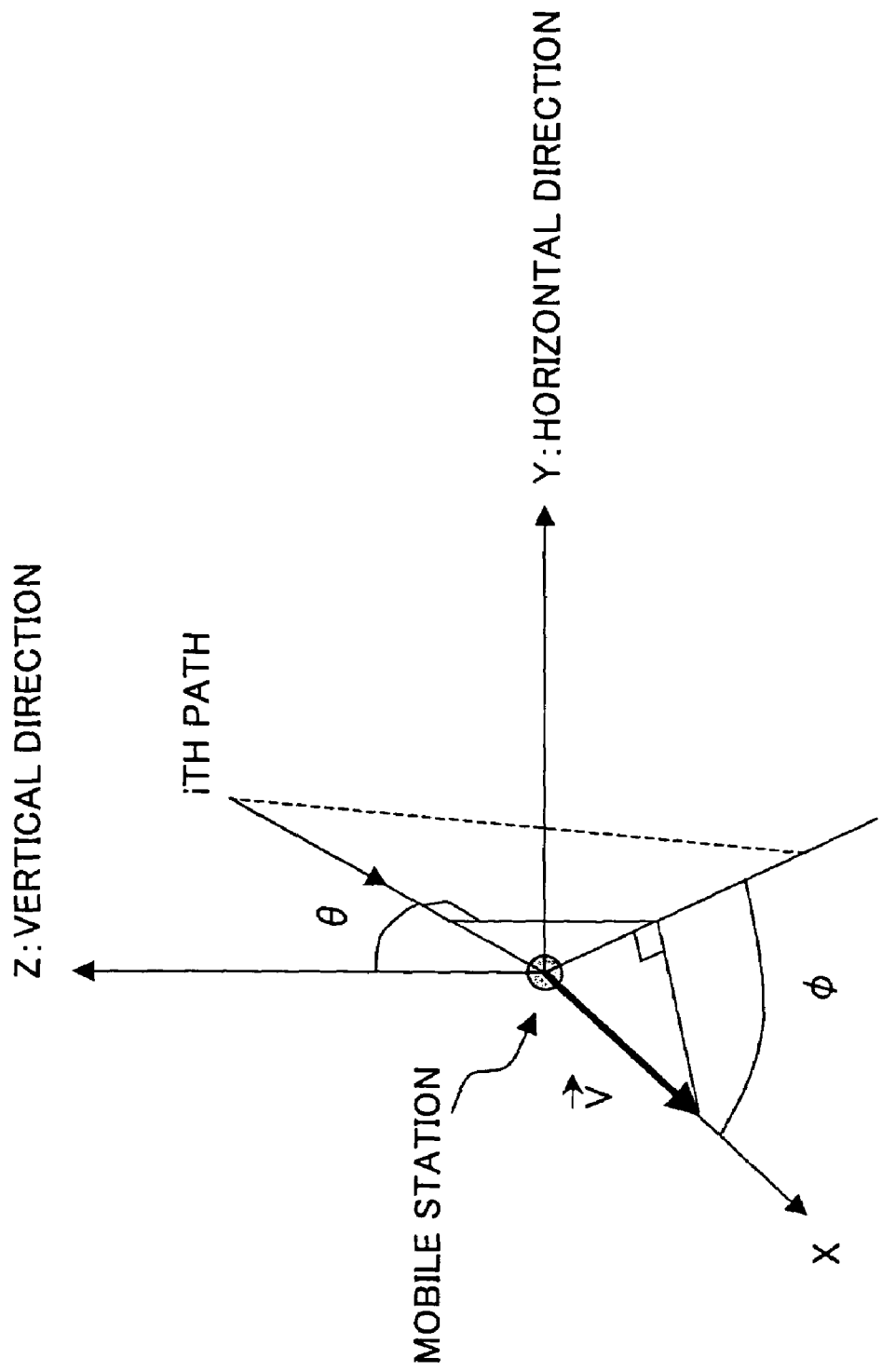
FIG. 5 is a 3-D graph showing a phase fluctuation when the mobile station is in motion according to the embodiment of the present invention.

As shown in FIG. 5, the propagation path generating unit 5 calculates phase rotation $\Delta\Omega i(t)$ of each propagation path by the following Equation 1 using information about the moving speed of the mobile station and about the direction of the initial incoming propagation path (specified in reference to the moving direction of the mobile station), which phase rotation is added to the initial phase value of each propagation path such that the time-varying phase characteristics of the N propagation paths have a Doppler phase rotation effect.

$$\Delta\Omega i(t) = (V \times t/\lambda) \cdot (\cos \phi i \times \sin \theta i) \qquad \text{[Equation 1]}$$

Here, V [m/sec] represents the moving speed of the mobile station, t [sec] represents the time, $\Omega i=(\theta i, \phi i)$ represents the initial arrival direction of the i-th propagation path, and $\lambda$ represents the wavelength of a wave coming through the propagation path.

Furthermore, the propagation path generating unit 5 is capable of reading data of a specified antenna directional-gain pattern file from the data storage unit 3 through the parameter input and control unit 2, the file being selected based on the contents of the propagation path generation parameter file, generating propagation paths by multiplying the initial amplitude and the directional gain according to the initial arrival direction of each propagation path, and generating and outputting N time-varying propagation paths divided into M (M>=1) groups for each of M antenna patterns.

The time-varying function generating unit 6 calculates time-varying shadow characteristics (amplitude and phase) for the N propagation paths while varying calculation models and various calculation conditions for model calculations using random numbers generated by the random number generating unit 4 based on the contents of the propagation path generation parameter file specified by the parameter input and control unit 2, the calculation results of which being provided to the propagation path generating unit 5. The time-varying shadow functions are continuously calculated according to requests from the parameter input and control unit 2 or the propagation path generating unit 5 until a calculation deactivation request is provided.

The output data buffer memory unit 7 temporarily stores output data concerning the time-varying propagation paths generated by the propagation path generating unit 5. While a deactivation request is not provided by the parameter input and control unit 2, the stored data are provided to the output interface unit 8 when the volume of the data stored exceeds a predetermined threshold of data capacity. When a deactivation request from the parameter input and control unit 2 is provided, all data that are stored, and data that are provided from the propagation path generating unit 5, are sequentially provided to the output interface unit 8.

With reference to FIG. 4, the output interface unit 8 serves as an interface unit for outputting the N time-varying propagation path characteristics (time-varying amplitudes, time-varying phases, initial time delays and initial arrival directions) generated by the propagation path generating unit 5 to an external device such as the propagation path output unit 10. Data representing the time-varying propagation path characteristics are temporarily stored in the output data buffer memory unit 7, and are then provided to the output interface unit 8. The time-varying propagation path characteristics are output to the external device through the interface unit 8 as N×M time-serial values.

The propagation path output unit 10 receives the N time-varying propagation paths calculated and generated by the propagation path generating unit 5 from the output interface unit 8, and converts the N time-varying propagation paths into real parts and imaginary parts of a complex amplitude using N time-varying amplitudes and N time-varying phases; and then, carries out digital-to-analog conversion to obtain and output 2×N×M analog signals.

The signal synthesizing unit 11:

receives M groups of time-varying propagation path signals, the groups consisting of the real part time-varying signals $W_R^{(11)}$ through $W_R^{(MN)}$ of the N complex amplitudes, and the imaginary part time-variable signals $W_I^{(11)}$ through $W_I^{(MN)}$ of the N complex amplitudes, distributes an IF or RF signal u(t) to M antenna branches, the IF or RF signal being input to the digital input signal terminal 12, generates orthogonal signals (Q component), the phases of which are shifted by $\pi/2$ from the distributed signals for every digital signal, each of the digital input signals, which is the I component $u_I(t)$, and the Q component $u_Q(t)$ is input into transversal type circuits (refer to FIG. 16), each of which consists of cascade connections of N−1 delay elements, N signals of the I component having different time delays corresponding to time delay of each of the propagation paths provided by the propagation path output unit 10 and corresponding real part time-varying signal of the N complex amplitudes are multiplied, and similarly, the N signals of the Q component having different time delays corresponding to time delay of each of the propagation paths provided by the propagation path output unit 10 and corresponding imaginary part time-varying signal of the N complex amplitudes are multiplied. The multiplied results are added for each of the N propagation paths. This process is repeated M times such that M signals $y^{(M)}(t)$ are generated, and are output from the digital signal output terminal 13. Equation 2 that follows shows the relations between the input signal and the output signal.

$$y^{(M)}(t) = y_I^{(M)}(t) + y_Q^{(M)}(t) \quad \text{[Equation 2]}$$

$$= \sum_{n=1}^{N} W_R(Mn)^* u_I(t + (n-1)T) +$$

$$\sum_{n=1}^{N} W_I(Mn)^* u_Q(t + (n-1)T)$$

In Equation 2, the carrier component is omitted from notation.

Figure 6:
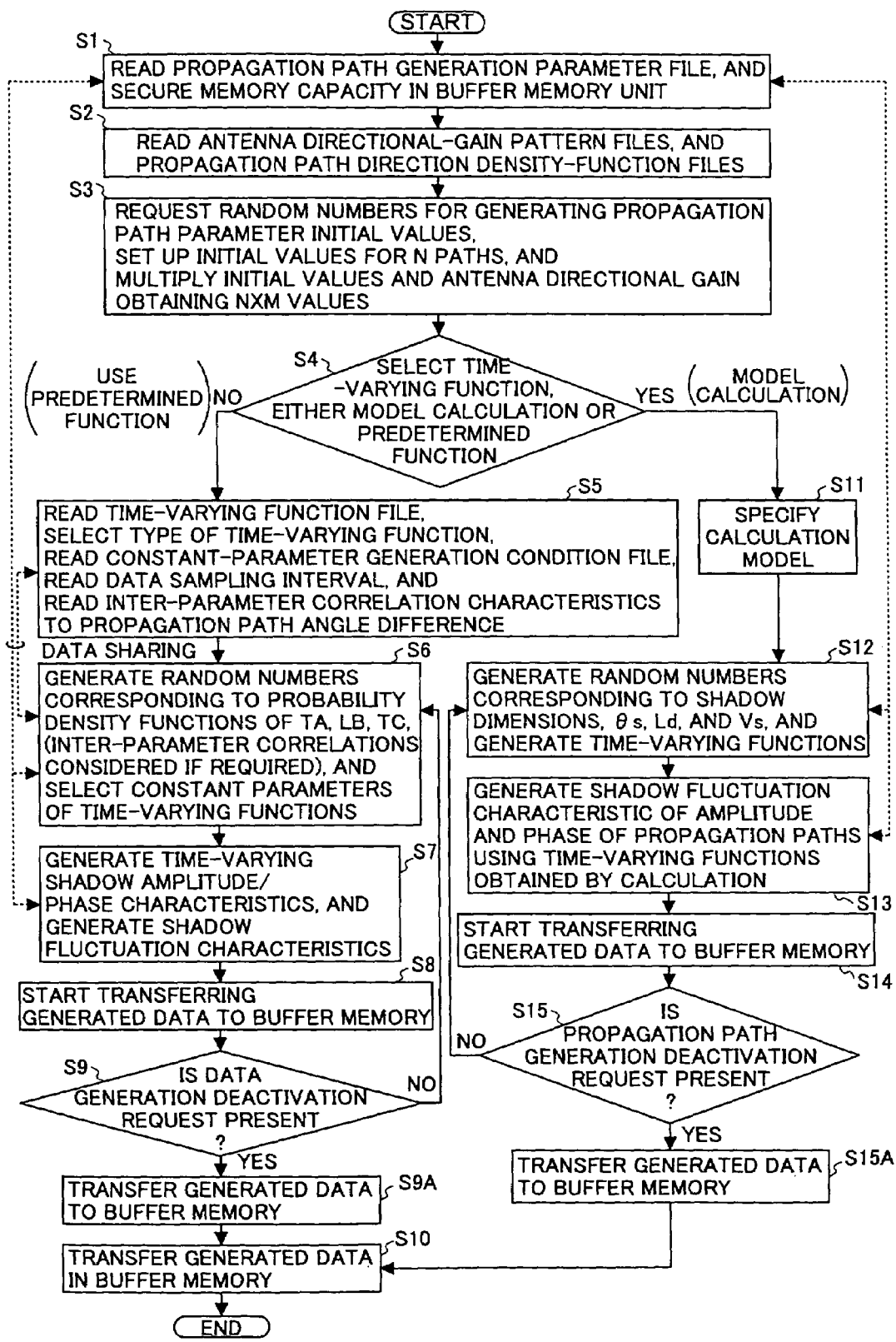
FIG. 6 is a flowchart showing operations of the time-varying multi-path generating apparatus according to the embodiment of the present invention.

FIG. 6 is a flow chart showing operations of the time-varying multi-path generating apparatus 9 according to the embodiment of the present invention. The operations of the present invention are explained in reference to steps S1 through S15 shown in the flow chart. Here, it is presumed that the data files, such as the propagation path generation parameter file, the time-varying function file, the antenna directional-gain pattern file, and the incoming propagation path direction density function file are stored in the data storage unit 3 by an operator in advance of generating time-varying multi-path propagation paths according to the present invention.

At step S1, the parameter input and control unit 2 reads the propagation path generation parameter file from the data storage unit 3, and secures memory capacity in the output data buffer memory unit 7, the capacity being sufficient for storing data that are to be generated for N propagation paths and M output antenna branches. The parameter input and control unit 2 shares the propagation path generation parameter file with the propagation path generating unit 5, or provides the file to the propagation path generating unit 5, and proceeds to step S2.

At step S2, the parameter input and control unit 2 reads M antenna directional-gain pattern files and direction density function files of an incoming propagation path corresponding to M output antenna branches from the data storage unit 3, and proceeds to step S3.

At step S3, the propagation path generating unit 5 requests the random number generating unit 4 to provide random numbers that fulfill the propagation path parameter initial value generation conditions of a propagation path to be generated, and obtains the random numbers from the random number generating unit 4. The random numbers are used to set up the initial conditions (initial amplitude, initial phase, initial time delay, and initial arrival direction) of N propagation path parameters.

As for the initial amplitude and the initial time delay, the propagation path generation parameter file may specify an exponential distribution function with a predetermined coefficient to be the delay profile function. In this case, the initial amplitude and initial time delay of N propagation paths are determined by a delay time step $\Delta T$, the number N of propagation paths to be generated, and an average delay spread value $S_D$ of a propagation path to be generated. Further, if the initial phase is uniformly distributed in the range between 0 and $2\pi$, the initial phase is determined by generating N uniform random numbers; and the initial arrival direction is determined by generating N random numbers according to the direction density function specified by the direction density function file of the incoming propagation path. How the random numbers for generating the initial values are to be generated is prescribed by the propagation path parameter initial value generation conditions specified by the propagation path generation parameter file.

After the initial values for the N propagation path parameters are determined, the initial amplitude values and the antenna directional gain in the direction of each incoming propagation path read from the antenna directional-gain pattern file stored in the data storage unit 3 are multiplied such that N×M propagation path parameters for N propagation paths and M antenna branches are set up. Then, the process proceeds to step S4.

FIG. 7 shows examples of initial values of the propagation path parameters generated according to the propagation path parameter initial value generating conditions, wherein the number of the propagation paths is set at N, the shape of the delay profile is set rectangular (i.e., amplitudes are constant regardless of delay time), the delay step is set at 1 µsec, the arrival direction is set at a uniform distribution over a 0-2π range, the phase characteristics are set at a uniform distribution over the 0-2π range, and the moving speed of the mobile station is set at 0 m/sec. At section (a) of FIG. 7, the delay profile constituted by the initial time delay and initial amplitude is shown. At section (b) of FIG. 7, the initial phase characteristics are shown. At section (c) of FIG. 7, the initial arrival direction characteristics are shown. The propagation path parameter initial value generation conditions of a propagation path to be generated are determined in the manner as described above, for example.

At step S4, the parameter input and control unit 2 determines whether a function to be generated by model calculation carried out by the time-varying space generating unit 6 is to be used as the time-varying function based on a type specification value for the time-varying function contained in the propagation path generation parameter file read from the data storage unit 3.

At step S5 (step S4 NO), the parameter input and control unit 2 reads the time-varying function file from the data storage unit 3, and shares the file with the propagation path generating unit 5, or provides the file to the propagation path generating unit 5. Based on the time-varying function file, the type of the time-varying function is determined, and the constant parameter generation condition file of the time-varying function is read from the propagation path generation parameter file stored in the data storage unit 3. Further, the data sampling interval is read, and the inter-parameter correlation characteristic file concerning a propagation path angle difference is also read, and the process proceeds to step S6.

At step S6, the propagation path generating unit 5 requires the random number generating unit 4 to generate and output random numbers corresponding to the probability density functions of the shadow time interval $T_A$, the shadow amplitude $L_B$, and the shadow occurrence time interval $T_C$ contained in the propagation path generation parameter file, and obtains the random numbers. If correlations are required to be attached to these random numbers, correlations corresponding to the difference of an incoming propagation path angle from the initial arrival direction specified by the parameter correlation characteristic file are attached such that random numbers having the requested correlations are generated. In this manner, the constant parameters of the time-varying function are determined using the random numbers, and the process proceeds to step S7.

Here, an example of a time-varying amplitude function serving as a time-varying function file is explained with reference to graphs presented in FIG. 8, which graphs show a shadow effect of a human being and the like. As shown at section (a) of FIG. 8, the shadow effect is represented by a shadow amplitude $L_B$ [dB] that is a function of time f(t), wherein $T_A$ [sec] represents a shadow time interval, and $T_C$ [sec] represents a shadow occurrence time interval. Since $T_A$ and $T_C$ determine the shape of the function as shown at section (b) of FIG. 8, $Y_A$ and $T_C$ serve as constant parameters. Then, as conditions that determine these constant parameters, the following is premised, for example. Namely, the shadow time interval $Y_A$ [sec] follows a normal distribution having an average $<T_A>$ [sec] and a standard deviation $\sigma_A$ [sec]; the shadow amplitude $L_B$ [dB] follows a normal distribution having an average $<L_B>$ [dB] and a standard deviation $\sigma_B$ [dB]; and the shadow occurrence time interval $T_C$ [sec] follows a normal distribution having an average $<T_C>$ [sec] and standard deviation $\sigma_C$ [sec]. Then, each of the parameters $T_A$ and $T_C$ can be obtained by N random numbers according to distribution of each of the parameters, such random numbers being required, and generated by the random number generating unit 4.

Figure 9A:
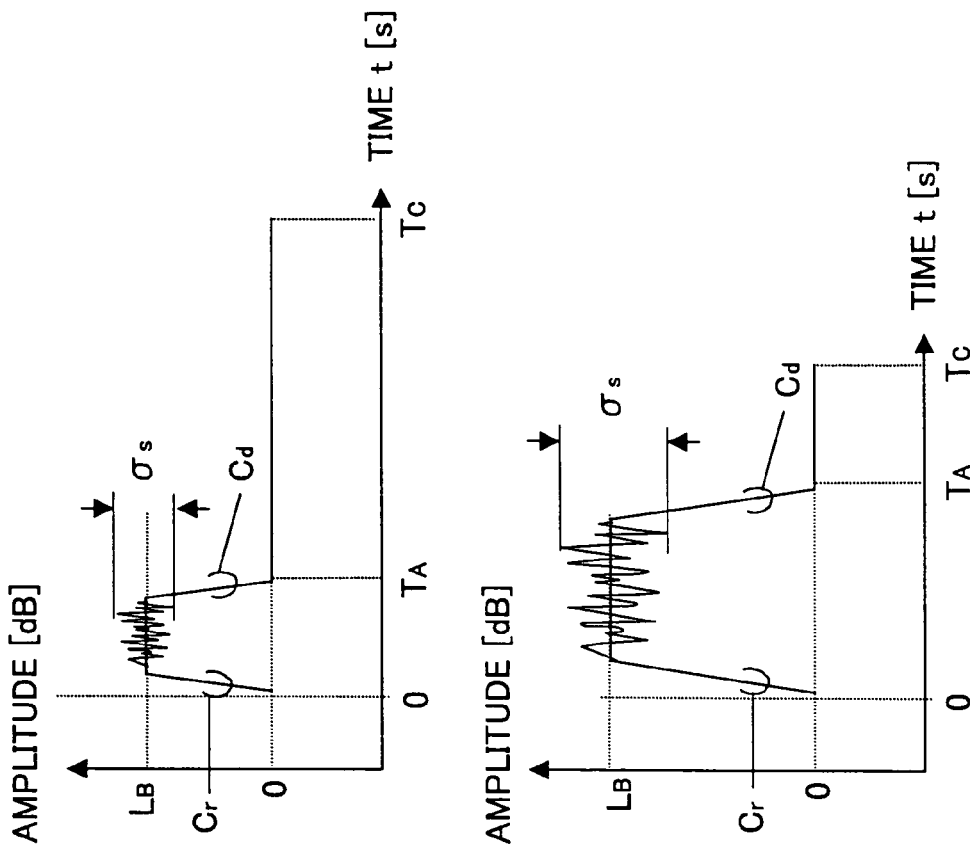
FIG. 9 shows another set of graphic examples of the time-varying function according to the embodiment of the present invention.
Figure 9B:
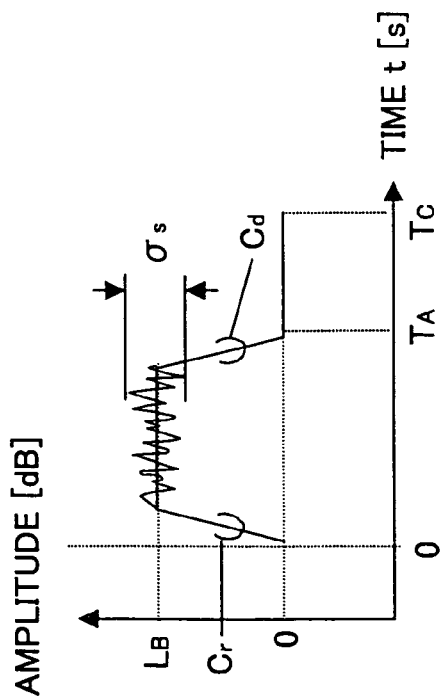

FIG. 9 shows another example of the time-varying amplitude function serving as the time-varying function file, when a big obstacle, such as a truck or a bus causes the shadow effect. At section (a) of FIG. 9, the shadow effect is expressed as a shadow amplitude $L_B$ [dB] that is a function of time g(t), where $T_A$ [sec] represents a shadow time interval, $T_C$ [sec] represents a shadow occurrence time interval, $C_d$ [dB/sec] represents a falling coefficient, $C_r$ [dB/sec] represents a rising coefficient, and $\sigma_S$ [dB] represents a standard deviation of shadow amplitude $L_B$ [dB] concerning the time of shadow occurrence. Since the function g(t) takes various shapes depending on these values as shown at section (b) of FIG. 9, these values are constant parameters that determine the shape of the function. Then, concerning conditions that determine these constant parameters, it is premised as follows, for example. Namely, the shadow time interval $T_A$ [sec] follows a normal distribution having an average $<T_A>$ [sec] and a standard deviation $\sigma_A$ [sec]. The shadow amplitude $L_B$ [dB] follows a normal distribution having an average $<L_B>$ [dB] and a standard deviation $\sigma_B$ [dB]. The shadow occurrence time interval $T_C$ [sec] follows a normal distribution having an average $<T_C>$ [sec] and a standard deviation $\sigma_C$ [sec]. The falling coefficient $C_d$ [dB/sec] follows a normal distribution having an average $<C_d>$ [dB/sec] and a standard deviation $\sigma_{Cd}$ [dB/sec]. The rising coefficient $C_r$ [dB/sec] follows a normal distribution having an average $<C_r>$ [dB/sec] and a standard deviation $\sigma_{Cr}$ [dB/sec]. The shadow fluctuation follows a normal distribution having an average 0 and a standard deviation $\sigma_S$ [dB]. Then, normally distributed random numbers serve each distribution, the random number generating unit 4 generating N random numbers accordingly. The time-variable functions cases that represent cases such as shown in FIG. 8 (shadow by a human) and FIG. 9 (shadow by a big obstacle-such as a truck or a bus) according to predetermined environmental conditions as required are beforehand prepared, and stored in the data storage unit 3 such that desired propagation path simulations are performed.

At step S7, based on the constant parameters of the time-varying functions determined at Step 6, the propagation path generating unit 5 generates time-varying shadow amplitude characteristics and time-varying shadow phase characteristics of N propagation paths, the time-varying shadow amplitude characteristics are deducted from the initial amplitude of each propagation path, and the time-varying shadow phase characteristics are added to the initial phase of each propagation path such that shadow fluctuation characteristics are generated for the amplitude and the phase, respectively, of each propagation path. At the same time, the propagation path generating unit 5 calculates the time phase rotation $\Delta\Omega i(t)$ by the formula (1) using information about the moving speed of the mobile station, and information about the incoming direction of an initial propagation path (specified in reference to the moving direction of the mobile station), which time phase rotation is added to the initial phase of each propagation path such that a Doppler phase rotation effect can be attached to the time-varying phase characteristics of each of the N propagation paths. Then, the process proceeds to step S8.

At step S8, the propagation path generating unit 5 confirms that the time-varying data that are obtained by the next random number generation and that are to be added in continuation would not influence the present result, then the data are transferred to the output data buffer memory 7. Then, the process proceeds to step S9.

At step S9, while the propagation path generating unit 5 repeatedly generates data of the shadow fluctuation characteristics for the amplitude and the phase of each propagation path, and repeatedly adds serially in the time domain such that output data are generated, the propagation path generating unit 5 determines whether there is a propagation path generation deactivation request from the parameter input and control unit 2. If it is determined that no deactivation requests are present, the process returns to step S6, and generation of the shadow fluctuation characteristics for the amplitude and the phase of subsequent propagation paths is repeated. Here, the time-varying shadow amplitude characteristics to be deducted and the time-varying shadow phase characteristics to be added for each propagation path are continuously generated in every shadow occurrence time interval.

Therefore, when the shadow time interval $T_A$ [sec] is greater than the shadow occurrence time interval $T_C$ [sec], shadows overlap as shown by the second graph in FIG. 10. In this case, the shadow amplitudes of the shadows are simply added such that the time-varying shadow amplitude characteristics and the time-varying shadow phase characteristic are obtained as shown by the bottom graph in FIG. 10.

In the case that the parameter input and control unit 2 provides a propagation path generation deactivation request, the process proceed to step S9 A wherein data generation is stopped, data that have been generated before the deactivation request are provided to the output data buffer memory 7, and the process proceeds to step S10.

At step S10, the output data buffer memory unit 7 stores the data provided by the propagation path generating unit 5, and outputs the data to the output interface unit 8 when the amount of the data exceeds a predetermined value. In the case that a generation deactivation request is provided from the parameter input and control unit 2, all the data stored are sequentially output to the output interface unit 8 until all the data are output, even if the data amount of the output data buffer memory unit 7 does not reach the predetermined value. In this manner, the propagation path generation is finished.

At step S11 (step S4 YES), the parameter input and control unit 2 determines which calculation model is to be used by the time-varying function generating unit 4 based on the shadow fluctuation calculation-model file, frequency F [GHz], and the distance $L_0$ [m] between the base station and the mobile station (the shortest of the propagation paths). Then, the process proceeds to step S12.

At step S12, the propagation path generating unit 5 requests the random number generating unit 4 to generate random numbers for each of dimensions ($W_h$ [m], $D_h$ [m], and $H_h$ [m]) of a shadowing object (obstacle), the penetration angle θs [degrees] of the shadowing object to the propagation path, the penetration position Ld [m] of the shadowing object, and the moving speed Vs [m/s] of the shadowing object based on the probability density function of the shadowing object dimensions ($W_h$ [m], $D_h$ [m], $H_h$ [m]), the penetration angle θs [degrees] of the shadowing object to the propagation path, the probability density function of the penetration position Ld [m] of the shadowing object, and the probability density function of the moving speed Vs [m/s] of the shadowing object, respectively. The random numbers obtained in this manner are provided to the time-varying function generating unit 6, various parameters for the calculation model are determined, and the time-varying function generating unit 6 generates N time-varying functions. When correlations are required between the random numbers, a correlation corresponding to the difference between the initial arrival direction specified by the parameter correlation characteristic file and the incoming propagation path angle is attached, and the random numbers are generated. Then, the process proceeds to step S13.

Figure 11:
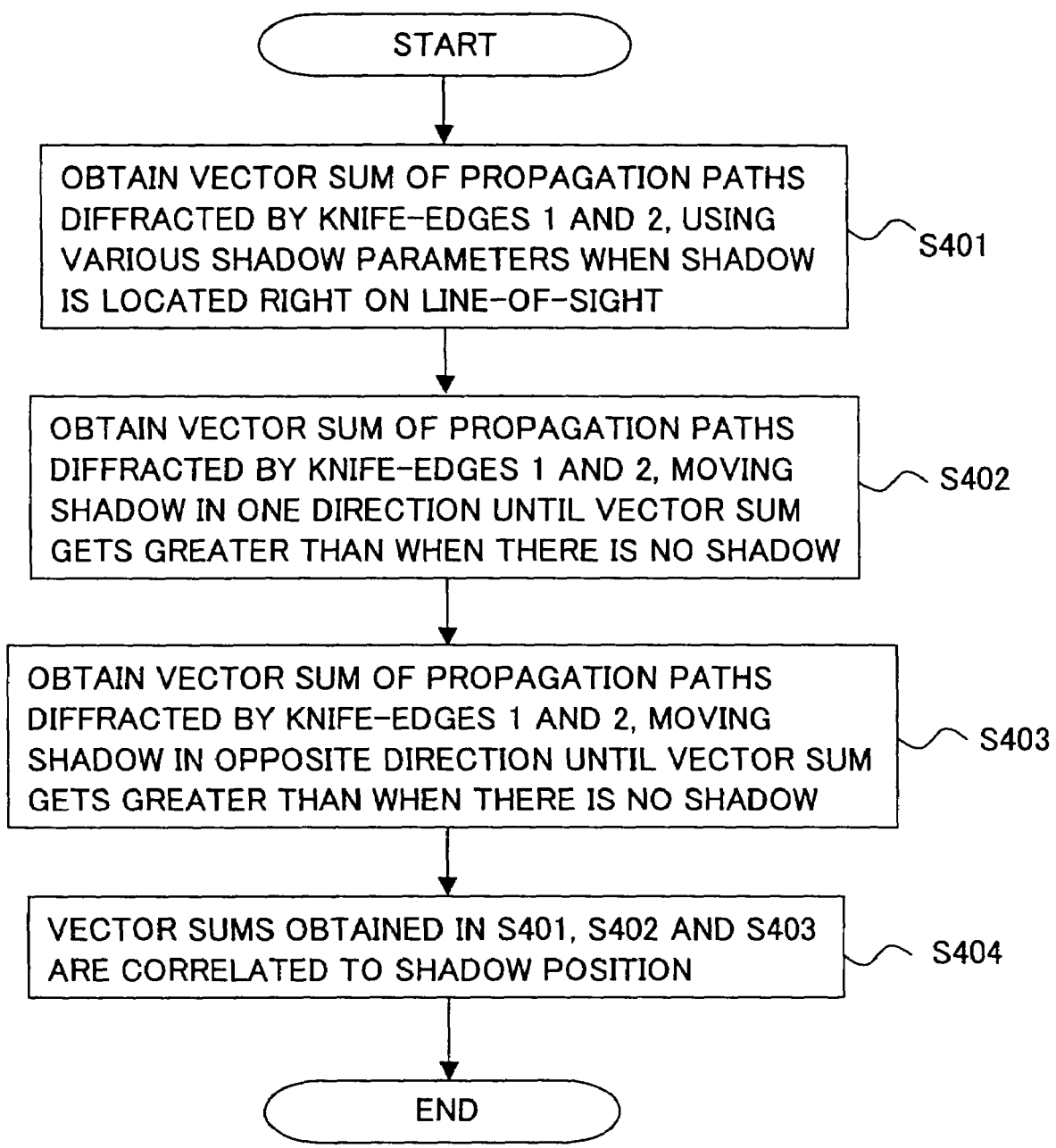
FIG. 11 is a flowchart showing operations of a time-varying function generating unit according to the embodiment of the present invention.

FIG. 11 is a flowchart of a calculation model for generating a time-varying amplitude function and a time-varying phase function.

Figure 12:
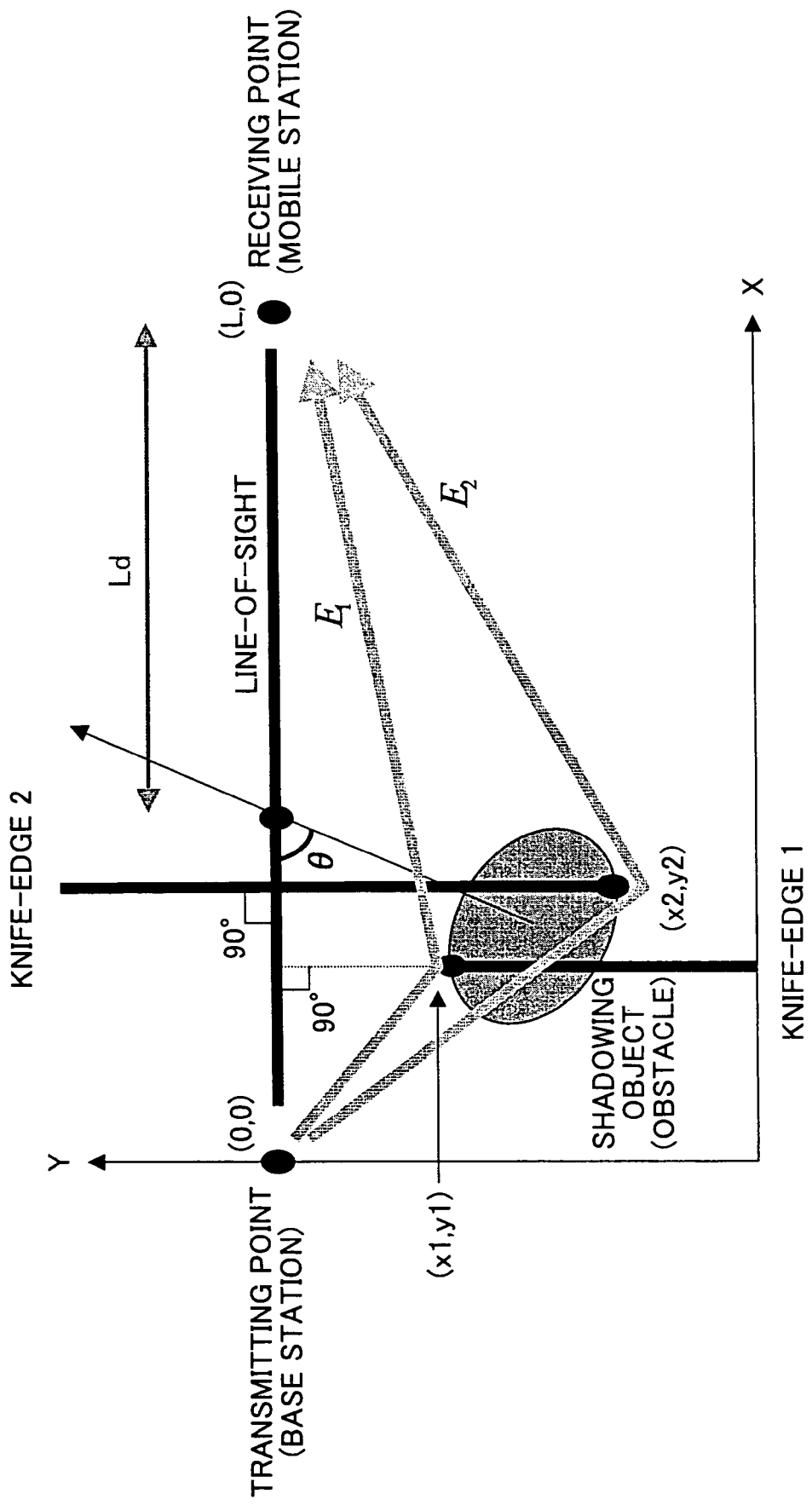
FIG. 12 is a graph of an example for calculating a power level fluctuation due to shadow.

The outline of the calculation model is illustrated in FIG. 12. In the calculation model of the present embodiment shown in FIG. 12, $L_0$ [m] represents the distance between the base station and the mobile station (the shortest propagation path), F [GHz] represents frequency of the wave coming through the propagation path, Ld [m] represents the penetration position of the shadowing object (obstacle) measured from the mobile station, θ [degrees] represents the penetration angle of the shadowing object, and the dimensions of the shadowing object are given as an elliptic cylinder having a minor axis a [m] and a major axis b [m]. When the shadowing object is present right in the line of sight, the received electric field strength E is expressed as follows.

[Equation 3]
$$E = E_1 + E_2 \quad (2)$$

Here, E1 and E2 are the field strengths of the radio propagation paths that are diffracted by knife-edges 1 and 2, respectively.

Further, E1 and E2 are given by the following formula.

[Equation 4] (3)
$$E_x = \sqrt{\frac{j}{2}} E_f \left[ \frac{1}{2} + C(\omega_x) - j \left\{ \frac{1}{2} + S(\omega_x) \right\} \right] \quad \text{※} x = 1 \text{ or } 2$$

Here, $E_f$ is the free-space electric field strength at the mobile station, i.e., the receiving point where no shadows are present. $E_f$ is expressed as follows.

[Equation 5]
$$E_f = \frac{\sqrt{30P}}{l_0} \quad [V/m]$$

Here, P represents the radiation power at a transmitting antenna. C and S are Fresnel integrals and are expressed as follows.

[Equation 6] (4)
$$C(\omega_x) - jS(\omega_x) = \int_0^{\omega_x} e^{-j(\pi/2)t^2} dt \quad \text{※} x = 1 \text{ or } 2$$

Here, ω is called a clearance function, and is expressed as follows.

[Equation 7] (5)
$$\omega_1 = -y_1 \sqrt{\frac{2(l_0)}{x_1(l_0 - x_1)\lambda}} \quad \omega_2 = y_2 \sqrt{\frac{2(l_0)}{x_2(l_0 - x_2)\lambda}}$$

Here, $l_0$ [m], equivalent to $L_0$ elsewhere, represents the distance between the base station and the mobile station, λ [m] represents the wavelength of the wave coming through the propagation path, and (x1, y1) and (x2, y2) represent the coordinates of the knife-edges 1 and 2, respectively, shown in FIG. 12.

With reference to FIG. 11, the calculation process of the time-varying function based on this calculation model is explained. At step S401, the positions (coordinates) of the knife-edges 1 and 2 in the case that the center of the shadowing object (obstacle) is located on the line-of-sight are calculated using the parameters. Namely, the parameters are the distance $L_O$ [m] between the base station and the mobile station (shortest propagation path), and the penetration position Ld [m] of the shadowing object measured from the mobile station, the shadowing object penetration angle θ [degrees], and the shadowing object dimensions (in the present model, the elliptic cylinder having the minor axis a [m] and the major axis b [m]). Then, the electric field strengths E1 and E2 of the propagation paths diffracted by the knife-edges 1 and 2, respectively, are calculated, and the electric field strength E is obtained by calculating a vector sum of E1 and E2.

At step S402, the position of the shadowing object is moved (downward in the case of FIG. 12) away from the line-of-sight by a step distance that is a product of the moving speed [m] of the shadowing object and a data sampling interval, the positions of the knife-edges 1 and 2 are determined like in step S401, the electric field strengths of the diffraction propagation paths 1 and 2 are calculated, and the electric field strength E is obtained by calculating a vector sum of E1 and E2. This process is repeated until the vector sum E exceeds $E_f$ that is the electric field strength where no shadows are present (electric field strength of the direct propagation path).

At step S403, the position of the shadowing object is moved in the direction opposite to the case described above (i.e., upward in the case of FIG. 12) away from the line-of-sight by the step distance that is the product of the moving speed [m] of the shadowing object and the data sampling interval, the positions of the knife-edges 1 and 2 are determined like in step S401, the electric field strengths of the diffraction propagation paths 1 and 2 are calculated, and the electric field strength E is obtained by calculating the vector sum of E1 and E2. This process is repeated until the vector sum E exceeds $E_f$ that is the electric field strength where no shadows are present (electric field strength of the direct propagation path).

At step S404, the amplitudes and the phases of the electric field strength E obtained at steps S401, S402 and S403 are stored in the memory storage as the time-varying functions corresponding to the moving time of the shadowing object.

Figure 13:
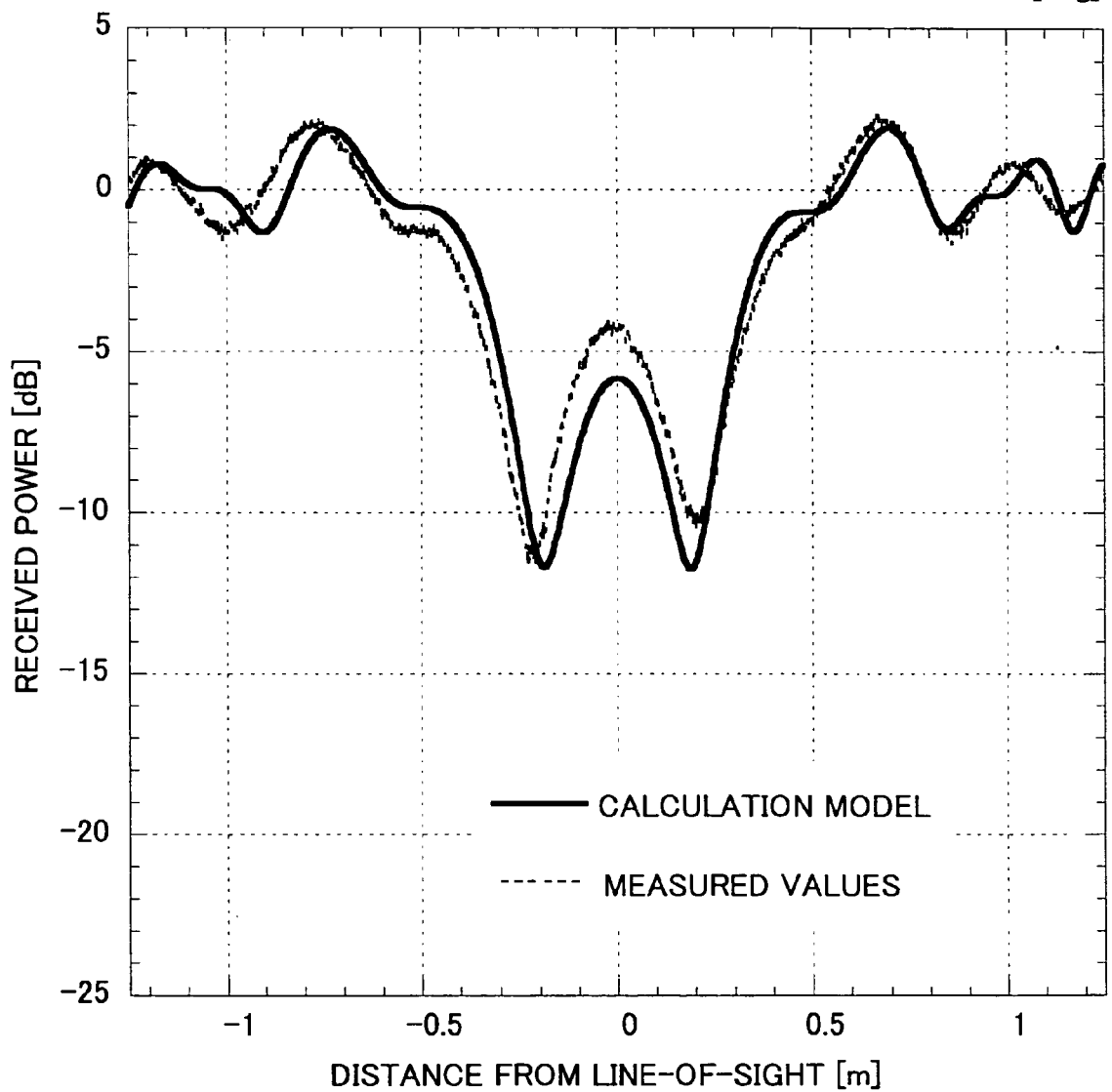
FIG. 13 is a graph showing comparison results of the power level fluctuation calculation with measured values concerning the shadow.

In FIG. 13, a solid line curve illustrates a calculation example of the received-power fluctuation with the parameter value being set as follows: $L_O$=13.5 m, F=7 GHz, Ld=3 m, θ=45 deg, a=0.49 m, and b=0.20 m. Here, the relations between the received power P and the electric field E are defined by the following formula.

[Equation 8]

$$P=10\log_{10}|E/E_f|^2 \quad (6)$$

A dotted line curve in FIG. 13 represents a measurement result performed on the same conditions. In the measurement, a human body serves as the shadowing object. The horizontal axis represents the position of the human body in reference to the line-of-sight. As seen from FIG. 13, the calculation model well approximates the received-power fluctuation, i.e., the time-varying amplitude function.

With reference back to FIG. 6, at step S13, the propagation path generating unit 5 time-serially (serially in the time domain) generates the shadow fluctuation characteristics for the amplitude and the phase of each propagation path by subtracting the time-varying shadow amplitude characteristics from the corresponding initial value, and by adding the time-varying shadow phase characteristics to the corresponding initial value, given that N time-varying functions (the time-varying amplitude functions and the time-varying phase functions) generated by the time-varying function generating unit 6 represent the time-varying shadow amplitude characteristics and the time-varying shadow phase characteristics, respectively, of each of the N propagation paths.

At this time, the propagation path generating unit 5 calculates the time phase rotation $\Delta\Omega i(t)$ of each propagation path according to the formula (1) based on the moving speed of the mobile station and the information about the initial direction of the incoming propagation path (specified in reference to the moving direction of the mobile station), and the time phase rotation is added to the initial phase of each propagation path such that the Doppler effect is attached to the time-varying phase characteristics of the N propagation paths. Then, the process proceeds to step S14.

At step S14, the propagation path generating unit 5 starts outputting the data generated at step S13 to the output data buffer memory 7 unless it is determined that time-varying data that are to be continuously added by the next random number generation influence the present result, while the shadow fluctuation characteristic data of the amplitude and the phase for each propagation path continuously generated at step 13 based on the random numbers generated at step S12 are repeatedly added in the time domain at step S15 as shown in FIG. 10. Then, the process proceeds to step S15.

At step S15, the propagation path generating unit 5 determines whether there is a propagation path generation deactivation request from the parameter input and control unit 2. If there is no deactivation request (step S15 NO), the process returns to step S12, and the propagation path generating unit 5 repeats generation of the shadow fluctuation characteristics for the amplitude and the phase of each propagation path. Here, the time-varying shadow amplitude characteristics and the time-varying shadow phase characteristics that are deducted and added, respectively, from/to the amplitude and the phase, respectively, of each propagation path are continuously generated for every shadow occurrence time interval. For this reason, a group of time-varying characteristics that overlaps with another group of time-varying characteristic may be generated as shown in FIG. 10 as described in reference to step S9. If such overlap takes place, the overlapping shadow characteristics are simply added to obtain the time-varying shadow phase characteristics and the shadow amplitude characteristics.

In the case where there is a propagation path generation deactivation request from the parameter input and control unit 2 (step S15 YES), the process proceeds to step S15A wherein data having been so far generated are sequentially provided to the output data buffer memory 7, and the process proceeds to step S10.

Figure 14:
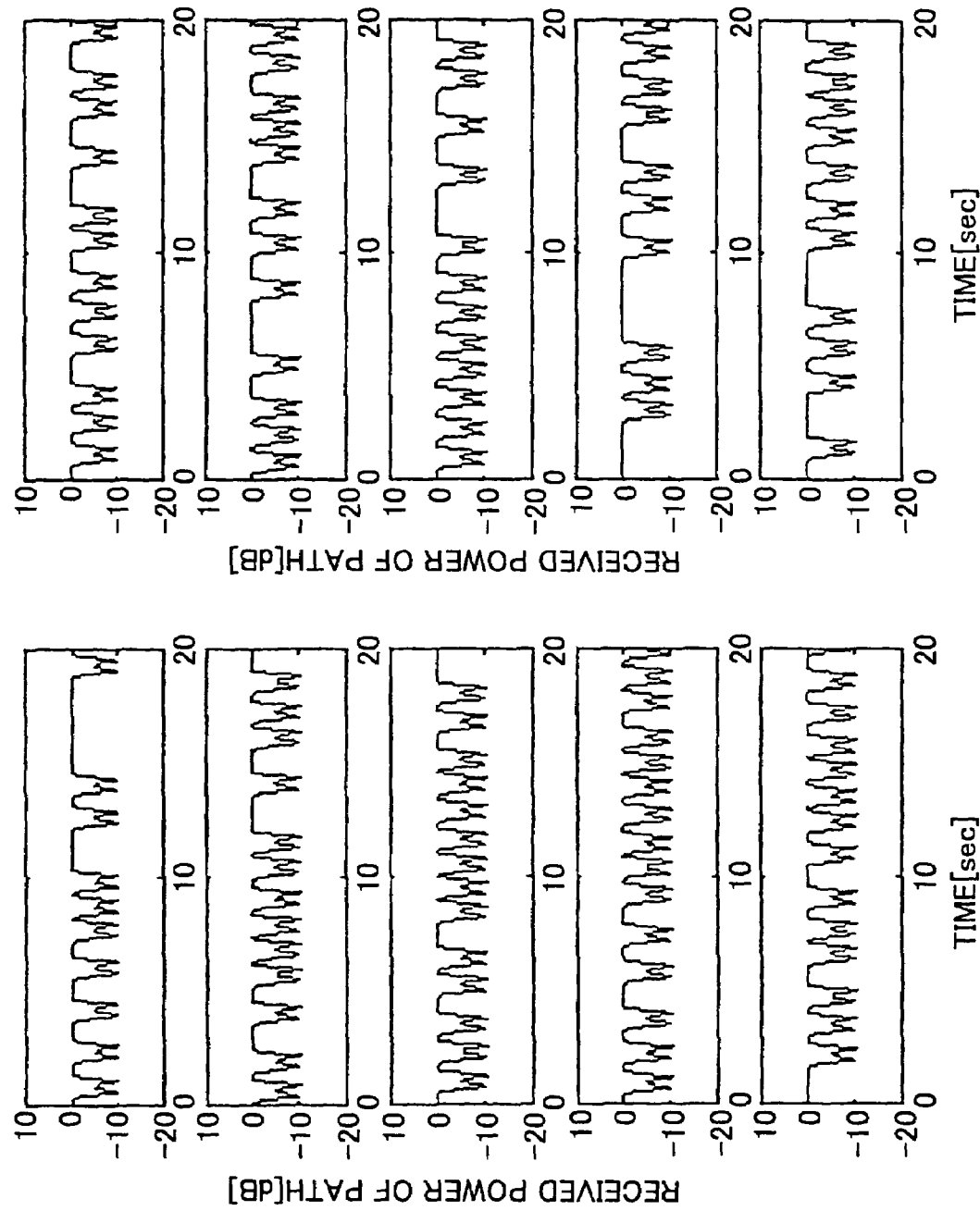
FIG. 14 shows graphic examples of receiving power levels when the power level fluctuation due to shadow is provided to each propagation path.

FIG. 14 shows an example of propagation path status of 10 propagation paths after level fluctuations are attached. The example shows the time-varying amplitude fluctuation of each propagation path corresponding to the same penetration position, penetration angle, dimensions of the shadow, and moving speed of the shadow, where the moving speed of the mobile station is set at 0 m/s, and the shadow occurrence interval is set by an exponential distribution having an average of 0.5 sec. In the example graphs, the vertical axis represents the shadow amplitude $L_B$ [dB], and the horizontal axis represents the time where the shadow time interval $T_A$ of each shadow is set at 1 sec. Further, the example is prepared on the premise that no shadows overlap. Note that shadows overlap in the case of FIG. 10. Nevertheless, the conditions giving the shadow fluctuations are not limited to those described above, but are replaced with, or added to the above calculation conditions according to environmental conditions under which a simulation is to be performed.

Figure 15:
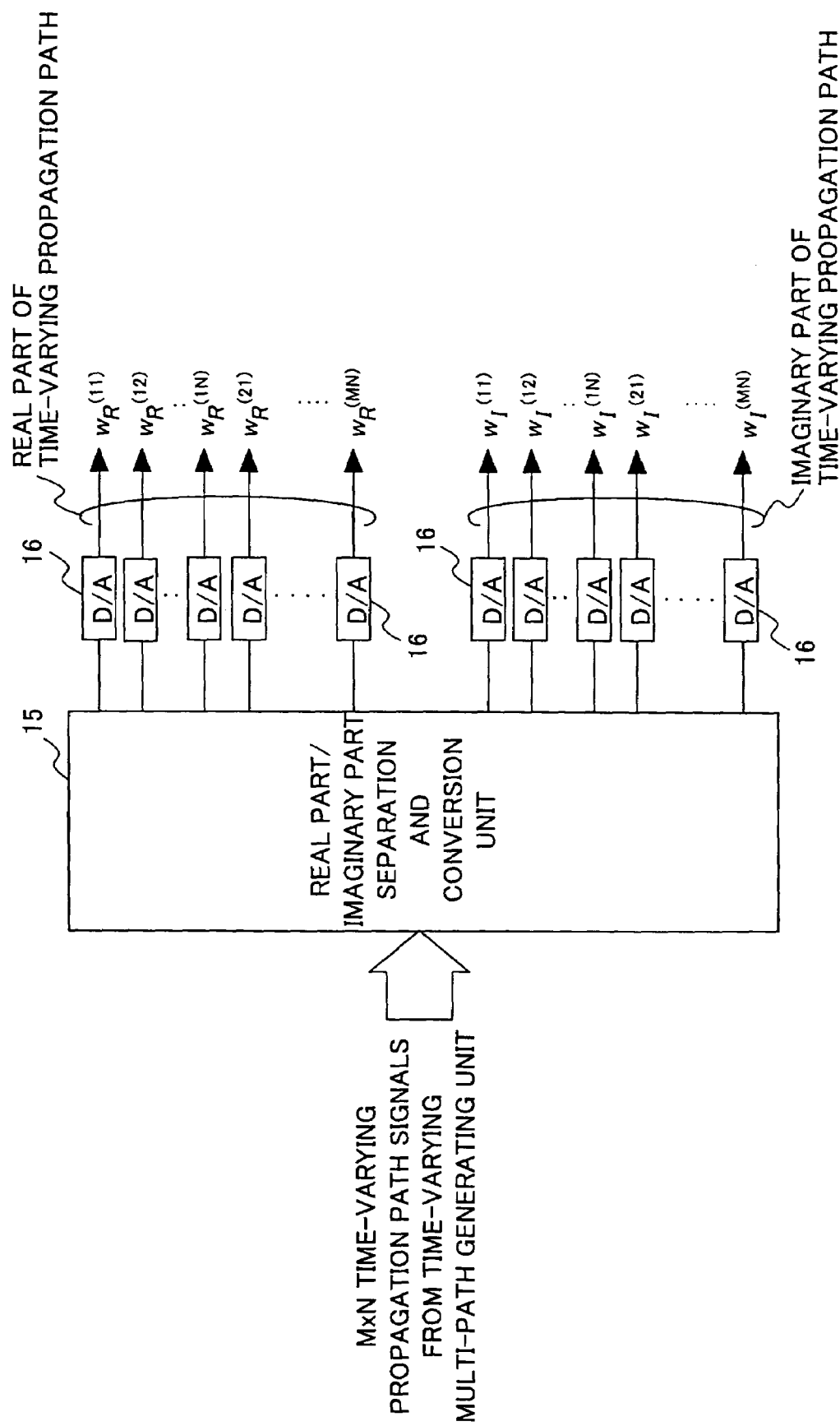
FIG. 15 is a block diagram showing a configuration example of a propagation path output unit according to the embodiment of the present invention.

FIG. 15 shows a configuration example of the propagation path output unit 10 of the multi-path simulator 14 shown in FIG. 4 according to the embodiment of the present invention. The propagation path output unit 10 includes a real part/imaginary part separation and conversion unit 15, and digital-to-analog (D/A) converters 16. The real part/imaginary part separation and conversion unit 15 extracts a real part signal and an imaginary part signal from each of the M×N time-varying complex amplitudes of the propagation path fluctuations provided by the multi-path generating apparatus 9, and outputs the real part signals and the imaginary part signals to the D/A converters 16. There are 2×M×N D/A converters 16 that carry out D/A conversion and output the time-varying propagation path signals in analog form.

Figure 16:
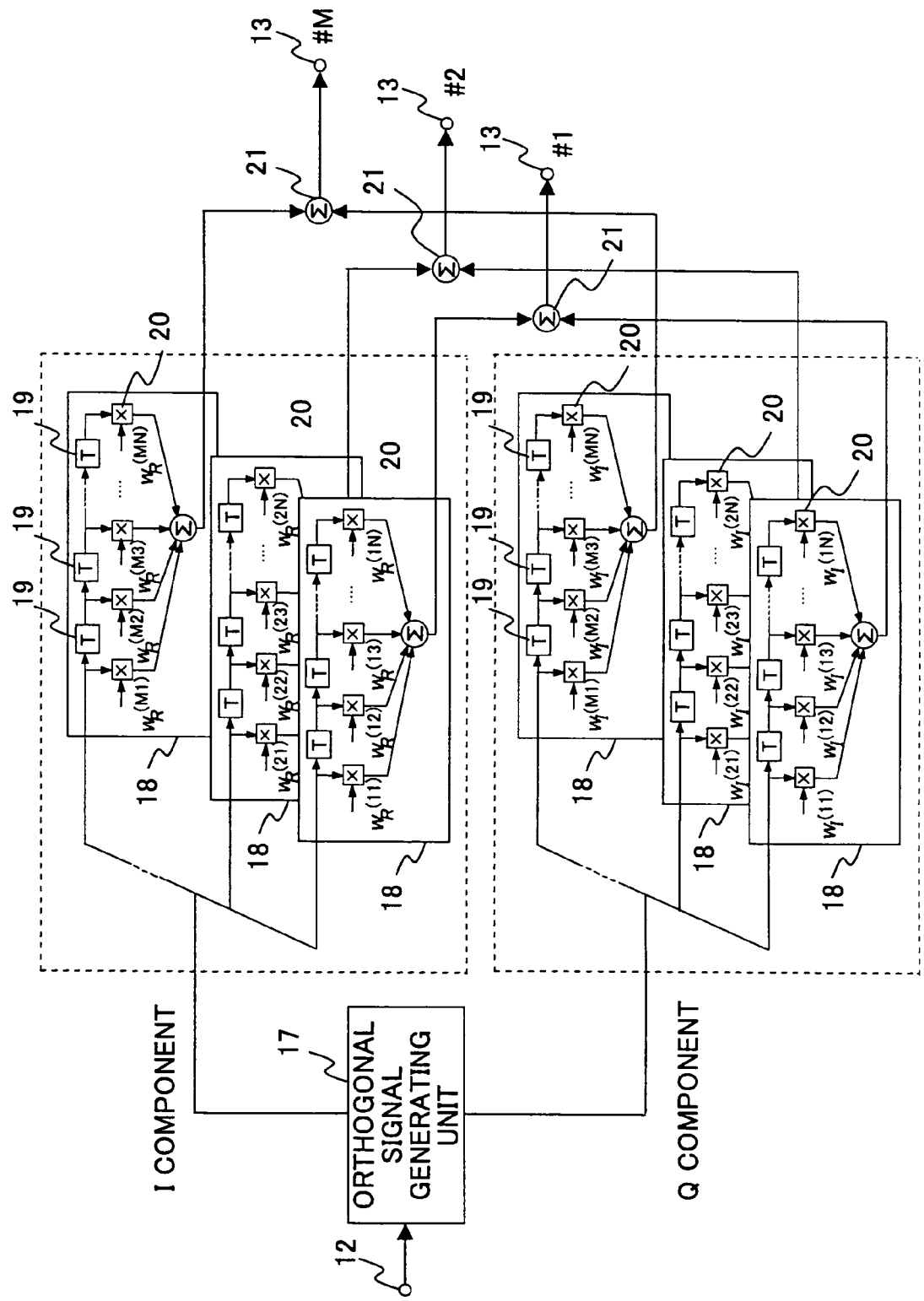
FIG. 16 is a block diagram showing a configuration example of a signal synthesizing unit according to the embodiment of the present invention.

FIG. 16 shows a configuration example of the signal synthesizing unit 11 of the multi-path simulator 14 according to the embodiment of the present invention. The signal synthesizing unit 11 includes an orthogonal signal generating unit 17, transversal type circuits 18, delay elements 19, multipliers 20, and adders 21. The analog output of the propagation path output unit 10 is provided to each of the multipliers 20 as a multiplication weight. The orthogonal signal generating unit 17 generates an orthogonal signal (Q component) from the signal (I component) provided through the digital signal input terminal 12. The I component and the Q component are divided into M signals that are named the first signal through the Mth signal. Here, N represents the number of propagation paths and M represents the number of antennas. The first signal of the I component is provided to the transversal type circuit 18 numbered as I-1, the second signal is provided to the transversal type circuit 18 numbered as I-2, and so on up to the Mth signal being provided to the transversal type circuit 18 numbered as I-M. Similarly, the first signal of the Q component is provided to the transversal type circuit 18 numbered as Q-1, and the second signal is provided to the transversal type circuit 18 numbered as Q-2, and so on up to the Mth signal being provided to the transversal type circuit 18 numbered as Q-M.

As described above, the propagation path output unit 10 outputs N propagation path signals for each of M antennas, the signals having a real part signal and an imaginary part signal. Namely, each of the real part signals are called $wR^{(11)}$, $wR^{(12)}$, and through $wR^{(1N)}$; $wR^{(21)}$, $wR^{(22)}$, and through $wR^{(2N)}$; and up through $wR^{(M1)}$, $wR^{(M2)}$, and through $wR^{(MN)}$. Similarly, the imaginary part signals are called $wI^{(11)}$, $wI^{(12)}$, and through $wI^{(1N)}$; $wI^{(21)}$, $wI^{(22)}$, and through $wI^{(2N)}$; and up through $wI^{(M1)}$, $wI^{(M2)}$, and through $wI^{(MN)}$.

The propagation path fluctuation signals $wR^{(11)}$, $wR^{(12)}$, and through $wR^{(1N)}$ serve as the weights provided to the first, second, and through Nth multipliers 20, respectively, of the transversal type circuit 18 No. I-1. Similarly, the propagation path fluctuation signals $wR^{(M1)}$, $wR^{(M2)}$, and through $wR^{(MN)}$ serve as the weights provided to the first, second and through Nth multipliers 20, respectively, of the transversal type circuit 18 No. I-M.

Similarly, the propagation path fluctuation signals $wI^{(11)}$, $wI^{(12)}$, and through $wI^{(1N)}$ serve as the weights provided to the first, second, and through Nth multipliers 20, respectively, of the transversal type circuit 18 No. Q-1; and the propagation path fluctuation signals $wI^{(M1)}$, $wI^{(M2)}$ and through $wI^{(MN)}$ serve as the weights provided to the first, second, and through Nth multipliers 20, respectively, of the transversal type circuit 18 No. Q-M. The I component and Q component output by each transversal type circuit 18 are added for every group corresponding to each of the M antennas, and M output signals are obtained. In this manner, the input signal is transformed into the output signals wherein the influence of a directional pattern of every antenna is taken into consideration.

Figure 17:
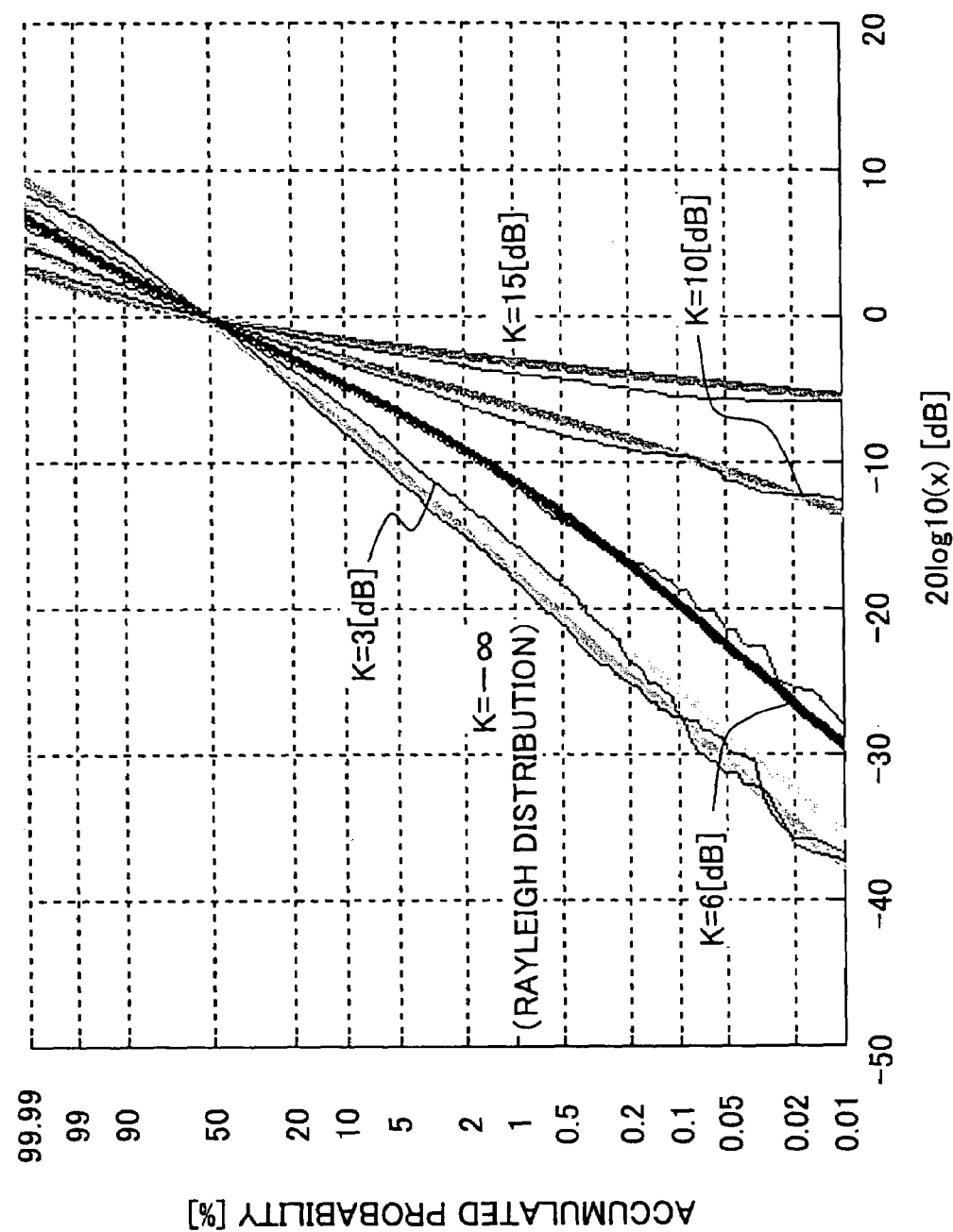
FIG. 17 is a graph that shows an example of the results that the fading simulator outputs according to the embodiment of the present invention with the Rayleigh distribution being added.

In FIG. 17, thin lines show examples of outputs of the fading simulator according to the embodiment of the present invention. Thick lines show Rayleigh distributions where a parameter K takes values such as K=−infinity, 3, 6, 10, and 15 dB, respectively.

Figure 18:
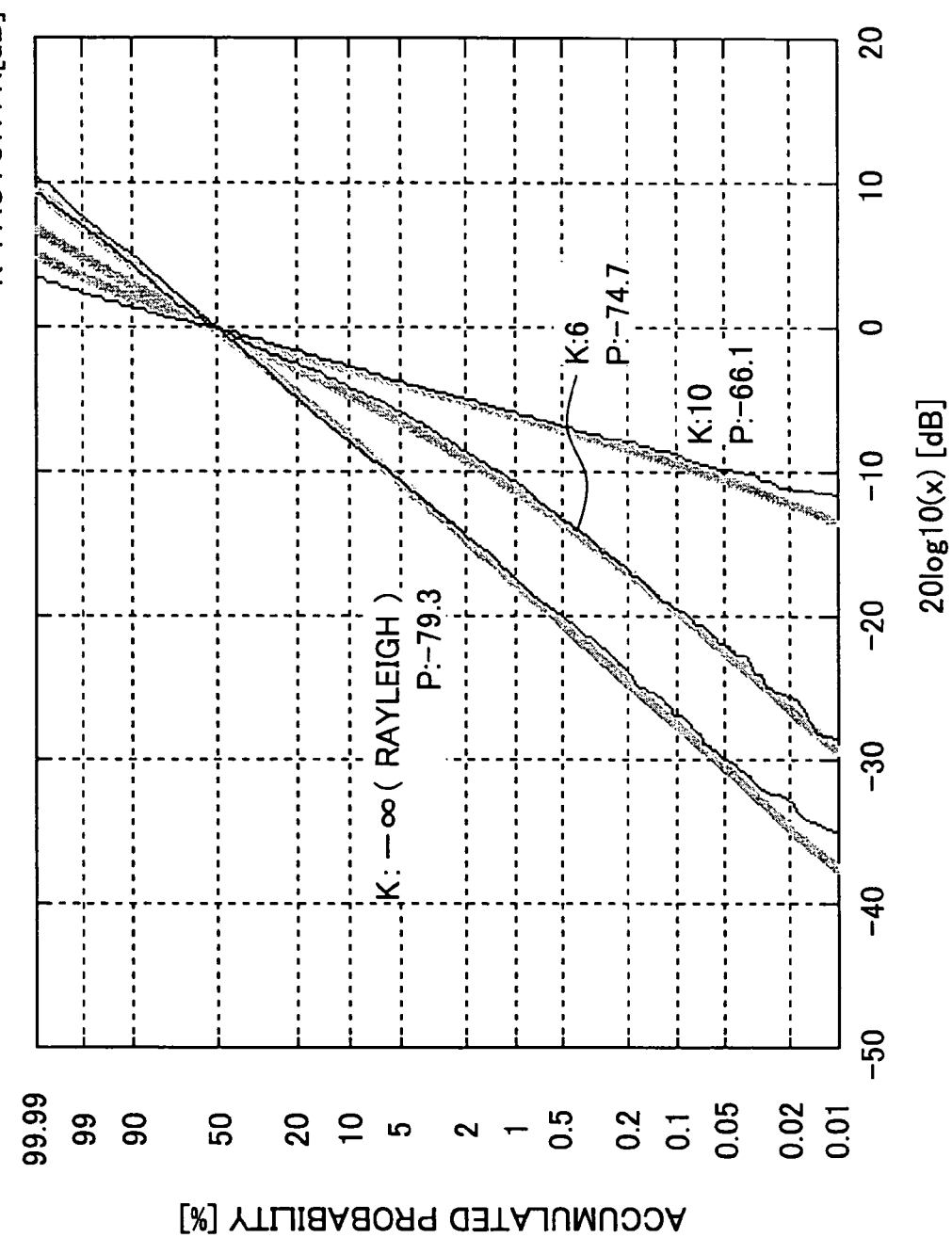
FIG. 18 is a graph that shows an example of the measurement result of the synthesized receiving level with the Rayleigh distribution being added.

Further, in FIG. 18, thin lines show examples of measurement results of the receiving level characteristics when measured inside of a building. Thick lines show Rayleigh distributions where K=−infinity, 6, and 10 dB, respectively. As seen from FIG. 17 and FIG. 18, both examples of the output results of the fading simulator according to the embodiment and the measurement results are well in agreement with the Rayleigh distributions with various K factors.

[Effect of the Invention]

As described above, according to the present invention, the time-varying characteristics (the time-varying multi-path fluctuation) of the propagation path parameters (power level characteristics, phase characteristics, time delay characteristics, and arrival direction characteristics) corresponding to desired simulation conditions are generated by synthesizing propagation path parameters of individual propagation paths, taking correlations of spatial propagation paths into consideration, rather than simply employing conventional Rayleigh fading or Nakagami-Rice fading. Further, it was confirmed that Rayleigh fading, Nakagami-Rice fading, and the like were reproducible, even when the mobile station is not moving, by obtaining a vector sum of two or more propagation paths generated according to the embodiment of the present invention. In this manner, the multi-path fading simulator that can simulate propagation path fluctuations that occur by actual propagation mechanisms is realized, which is highly valid and important.

Further, the present invention is not limited to these embodiments, but various variations and modifications may be made without departing from the scope of the present invention.

The present application is based on Japanese Priority Application No. 2003-045104 filed on Feb. 21, 2003 with the Japanese Patent Office, the entire contents of that are hereby incorporated by reference.

What is claimed is:

1. A time-varying multi-path generating apparatus for simulating multi-path fluctuations in radio communications between a transmission point and a receiving point, comprising:

a parameter control unit for controlling a plurality of conditions for generating a plurality of propagation paths, the conditions being parameters and data files, a data storage unit for storing the parameters and data files for generating the propagation paths, a random number generating unit for generating and outputting a plurality of random numbers based on a random number parameter provided by the parameter control unit, a propagation path generating unit for generating a plurality of time-varying propagation paths, and a buffer memory unit configured to store the generated time-varying propagation paths, wherein a plurality of time-varying amplitude functions and a plurality of time-varying phase functions are generated based on the parameters and data files for propagation path generation stored in the data storage unit, and the random numbers generated by the random number generating unit, the time-varying amplitude functions are aligned serially in the time domain such that a time-varying shadow amplitude function is obtained, which is repeated N times, where N represents the number of the propagation paths, resulting in N time-varying shadow amplitude functions, the time-varying phase functions are aligned serially in the time domain such that a time-varying shadow phase function is obtained, which is repeated N times, where N represents the number of the propagation paths, resulting in N time-varying shadow phase functions, an initial amplitude, an initial phase, an initial time delay, and an initial arrival direction are generated as the propagation path parameters of a propagation path using random numbers provided by the random number generating unit based on the initial value generation parameters stored in the data storage unit, and the time-varying shadow amplitude functions and the time-varying shadow phase functions are superimposed on the initial amplitude and the initial phase, respectively, for generating a plurality of time-varying propagation paths, wherein, when generating the time varying propagation paths, if a shadowing object is present in the line of sight, a received electric field strength E is given as the summation of E1 that is an electric field strength of a first radio propagation path diffracted by a knife-edge at one edge of said shadowing object and E2 that is an electric field strength of a second radio propagation path that is different from the first propagation path and diffracted by a knife-edge at another opposite edge of said shadowing object, said first radio propagation path starts at the transmission point, does not pass the another edge of said shadowing object, and is diffracted at the one edge of said shadowing object before reaching the receiving point, said second radio propagation path starts at the transmission point, does not pass the one edge of said shadowing object, and is diffracted at the another edge of said shadowing object before reaching the receiving point, and said shadowing object is between the first and second radio propagation paths.

2. A time-varying multi-path generating apparatus for simulating multi-path fluctuations in radio communications between a transmission point and a receiving point, comprising:

a parameter control unit for controlling a plurality of conditions for generating a plurality of propagation paths, the conditions being parameters and data files, a data storage unit for storing the parameters and data files for generating the propagation paths, a random number generating unit for generating and outputting a plurality of random numbers based on a random number parameter provided by the parameter control unit, a time-varying function generating unit for generating and outputting a plurality of time-varying amplitude functions and time-varying phase functions, serving as shadow characteristics of the propagation paths based on a shadow parameter stored in the data storage unit and the random numbers provided by the random number generating unit, a propagation path generating unit for generating a plurality of time-varying propagation paths, and a buffer memory unit configured to store the generated time-varying propagation paths, wherein the time-varying amplitude functions and the time-varying phase functions generated and provided by the time-varying function generating unit are aligned serially in the time domain such that a time-varying shadow amplitude function and a time-varying shadow phase function, respectively, are obtained, which obtaining is repeated N times, where N represents the number of the propagation paths, resulting in N time-varying shadow amplitude functions and N time-varying shadow phase functions, respectively, an initial amplitude, an initial phase, an initial time delay, and an initial arrival direction are generated as the propagation path parameters of a propagation path using the random numbers provided by the random number generating unit based on initial value generation parameters stored in the data storage unit, and the time-varying shadow amplitude function and the time-varying shadow phase function are superimposed on the initial amplitude and the initial phase, respectively, for generating a plurality of time-varying propagation paths, wherein, when generating the time varying propagation paths, if a shadowing object is present in the line of sight, a received electric field strength E is given as the summation of E1 that is an electric field strength of a first radio propagation path diffracted by a knife-edge at one edge of said shadowing object and E2 that is an electric field strength of a second radio propagation path that is different from the first propagation path and diffracted by a knife-edge at another opposite edge of said shadowing object, said first radio propagation path starts at the transmission point, does not pass the another edge of said shadowing object, and is diffracted at the one edge of said shadowing object before reaching the receiving point, said second radio propagation path starts at the transmission point, does not pass the one edge of said shadowing object, and is diffracted at the another edge of said shadowing object before reaching the receiving point, and said shadowing object is between the first and second radio propagation paths.

3. The time-varying multi-path generating apparatus as claimed in claim 1, wherein the propagation path generating unit generates the time-varying amplitude functions and the time-varying phase functions using the random numbers generated by the random number generating unit; the random numbers have correlations corresponding to inter-parameter correlation characteristics related to an arriving propagation path angle difference that is stored in the data storage unit for each of the propagation paths; and a shadow time interval, a shadow amplitude, and a shadow occurrence time interval are generated as correlated random numbers that are used as constant parameters of a time-varying function.

4. The time-varying multi-path generating apparatus as claimed in claim 1, wherein the propagation path generating unit adds a time-varying phase rotation to the time-varying phase characteristic of each time-varying propagation path by calculating the time-varying rotation due to the Doppler effect based on a moving speed of a mobile station, the moving speed being provided by the parameter control unit, and the initial arriving direction of each propagation path.

5. The time-varying multi-path generating apparatus as claimed in claim 1, wherein:

the data storage unit stores directional-gain pattern files of a plurality of antennas applicable to a mobile station, the directional-gain pattern files being provided by the parameter control unit, and containing information about directional gain, and the propagation path generating unit reads at least one of the directional-gain pattern files according to moving directions of the mobile station, calculates N propagation paths by multiplying the directional gain to the initial amplitude of each propagation path to obtain N time-varying propagation paths, which is repeated M times, M being the number of the antennas, and N×M time-varying propagations propagation paths are generated.

6. A multi-path fading simulator for simulating multi-path fading between a transmission point and a receiving point, comprising:

a time-varying multi-path generating apparatus for generating N time-varying propagation paths for each of M antennas, a buffer memory configured to store the generated time-varying propagation paths, a propagation path output unit for dividing M×N complex amplitudes of the time-varying propagation paths provided by the time-varying multi-path generating apparatus into real parts and imaginary parts, and outputting the real parts and the imaginary parts in an analog form, and a signal synthesizing unit, comprising:

at least one digital signal input terminal, at least one digital signal output terminal, an orthogonal signal generating unit for generating a plurality of orthogonal input signals (Q component) based on a plurality of digital signals (I component) input through the digital signal input terminal, 2×M transversal circuits, each comprising (N−1) delay elements that are cascaded, and N multipliers, wherein each of the I component and the Q component is distributed to specific transversal circuits, each of the N multipliers is provided with the respective real part, or the respective imaginary part, as applicable, output by the propagation path output unit, the real part or the imaginary part, as applicable, having an initial time delay, and the time delay of each multiplier is set equal to the time delay of the real part or the imaginary part, as applicable, and each digital signal delayed by 0, one or more delay elements, as applicable, and the propagation path fluctuation that is represented by the real part or the imaginary part, as applicable, are multiplied, and M signal synthesizing units for adding the multiplication results of every delay time such that the I component and the Q component are obtained, for combining the I component and the Q component such that a digital signal is generated for each of M antennas, and for outputting the digital signal to the digital signal output terminal, wherein, when generating the time varying multi-paths, if a shadowing object is present in the line of sight, a received electric field strength E is given as the summation of E1 that is an electric field strength of a first radio propagation path diffracted by a knife-edge at one edge of said shadowing object and E2 that is an electric field strength of a second radio propagation path that is different from the first propagation path and diffracted by a knife-edge at another opposite edge of said shadowing object, said first radio propagation path starts at the transmission point, does not pass the another edge of said shadowing object, and is diffracted at the one edge of said shadowing object before reaching the receiving point, said second radio propagation path starts at the transmission point, does not pass the one edge of said shadowing object, and is diffracted at the another edge of said shadowing object before reaching the receiving point, and said shadowing object is between the first and second radio propagation paths.

7. A time-varying multi-path generating method for simulating multi-path fluctuations in radio communications between a transmission point and a receiving point, comprising:

a step wherein a plurality of propagation path generation parameters and data files of propagation paths to be generated are stored in a data storage unit, the data files comprising propagation path generation parameter files, antenna directional gain pattern files, and time-varying function constant parameter generation condition files, a step wherein the parameter control unit reads the propagation path generation parameter files from the data storage unit a step wherein the parameter control unit reads data files about M antennas, such as the antenna directional gain pattern files, from the data storage unit, a step wherein the random number generating unit generates random numbers that fulfill propagation path parameter initial value generation conditions of a propagation path to be generated, a step wherein the propagation path generating unit sets up initial conditions, such as initial amplitude values of N propagation path parameters based on the random numbers, a step wherein the N initial amplitude values and antenna directional gains to a direction of an incoming propagation path obtained from the antenna directional gain pattern file are multiplied to obtain N×M propagation path parameters, which parameters are set up, a step wherein the parameter control unit reads the time-varying function constant parameter generation condition files from the data storage unit, a step wherein the propagation path generating unit generates time-varying function constant parameters based on random numbers generated by the random number generating unit, a step wherein the propagation path generating unit generates time-varying shadow amplitude characteristics and time-varying shadow phase characteristics of N propagation paths based on the time-varying function constant parameters, and generates shadow fluctuation characteristics of the amplitude and the phase of each of the N propagation paths, and a step wherein time-varying multi-paths are generated based on the generated shadow fluctuation characteristics and output from the propagation path generating unit, wherein, when generating the time varying propagation paths, if a shadowing object is present in the line of sight, a received electric field strength E is given as the summation of E1 that is an electric field strength of a first radio propagation path diffracted by a knife-edge at one edge of said shadowing object and E2 that is an electric field strength of a second radio propagation path that is different from the first propagation path and diffracted by a knife-edge at another opposite edge of said shadowing object, said first radio propagation path starts at the transmission point, does not pass the another edge of said shadowing object, and is diffracted at the one edge of said shadowing object before reaching the receiving point, said second radio propagation path starts at the transmission point, does not pass the one edge of said shadowing object, and is diffracted at the another edge of said shadowing object before reaching the receiving point, and said shadowing object is between the first and second radio propagation paths.

8. A time-varying multi-path generating method for simulating multi-path fluctuations in radio communications between a transmission point and a receiving point, comprising:

a step wherein a plurality of propagation path generation parameters and data files of propagation paths to be generated are stored in a data storage unit, the data files comprising propagation path generation parameter files, antenna directional gain pattern files, and time-varying function constant parameter generation condition files, a step wherein the parameter control unit reads the propagation path generation parameter files from the data storage unit, a step wherein the parameter control unit reads data files about M antennas, such as the antenna directional gain pattern files, from the data storage unit, a step wherein the random number generating unit generates random numbers that fulfill propagation path parameter initial value generation conditions of a propagation path to be generated, a step wherein a propagation path generating unit sets up initial conditions, such as initial amplitude values of N propagation path parameters based on the random numbers, a step wherein the N initial amplitude values and antenna directional gains corresponding to a direction of an incoming propagation path obtained from the antenna directional gain pattern file are multiplied to obtain N×M propagation path parameters, which parameters are set up, a step wherein the parameter control unit specifies a calculation model based on the propagation path generation parameter files, a step wherein the random number generating unit generates random numbers corresponding to shadow parameters, a step wherein the time-varying function generating unit generates N time-varying functions for the specified calculation model based on the random numbers, and a step wherein, time-varying shadow amplitude characteristics and time-varying shadow phase characteristics are generated for N propagation paths based on the generated time-varying functions generated by the propagation path generating unit, which amplitude characteristics and phase characteristics are multiplied by the amplitude and the phase, respectively, of each propagation path such that shadow fluctuation characteristics are generated, and a step wherein time-varying multi-paths are generated based on the generated shadow fluctuation characteristics and output from the propagation path generating unit, wherein, when generating the time varying multi-paths, if a shadowing object is present in the line of sight, a received electric field strength E is given as the summation of E1 that is an electric field strength of a first radio propagation path diffracted by a knife-edge at one edge of said shadowing object and E2 that is an electric field strength of a second radio propagation path that is different from the first propagation path and diffracted by a knife-edge at another opposite edge of said shadowing object, said first radio propagation path starts at the transmission point, does not pass the another edge of said shadowing object, and is diffracted at the one edge of said shadowing object before reaching the receiving point, said second radio propagation path starts at the transmission point, does not pass the one edge of said shadowing object, and is diffracted at the another edge of said shadowing object before reaching the receiving point, and said shadowing object is between the first and second radio propagation paths.

* * * * *